US006765751B2

(12) United States Patent
Huang et al.

(10) Patent No.: US 6,765,751 B2
(45) Date of Patent: Jul. 20, 2004

(54) DISK DRIVE SYSTEM WITH ENCLOSED REMOVABLE CARTRIDGE INCLUDING VOICE COIL/HEAD/DISK ASSEMBLY

(75) Inventors: Herb H. Huang, Eden Prairie, MN (US); Bruce F. Blumentritt, Rochester, MN (US)

(73) Assignee: HDVI Technology LLC, Eden Prairie, MN (US)

( * ) Notice: Subject to any disclaimer, the term of this patent is extended or adjusted under 35 U.S.C. 154(b) by 249 days.

(21) Appl. No.: 09/793,927

(22) Filed: Feb. 27, 2001

(65) Prior Publication Data

US 2003/0206367 A1 Nov. 6, 2003

Related U.S. Application Data

(60) Provisional application No. 60/212,040, filed on Jun. 16, 2000.

(51) Int. Cl.[7] .................. G11B 5/012; G11B 17/022
(52) U.S. Cl. ............................ 360/97.01; 360/133
(58) Field of Search ............... 360/97.01, 98.01, 360/133, 99.12, 97.02

(56) References Cited

U.S. PATENT DOCUMENTS

| | | | | |
|---|---|---|---|---|
| 4,317,146 A | | 2/1982 | Gervais | 360/98.01 |
| 4,359,762 A | | 11/1982 | Stollorz | 360/98.01 |
| 4,965,691 A | | 10/1990 | Iftikar et al. | 360/133 |
| 4,974,103 A | | 11/1990 | Iftikar et al. | 360/97.01 |
| 5,113,297 A | * | 5/1992 | Yoshida | 360/99.06 |
| 5,175,657 A | | 12/1992 | Iftikar et al. | 360/98.01 |
| 5,204,794 A | * | 4/1993 | Yoshida | 360/133 |
| 5,214,550 A | | 5/1993 | Chan | 360/98.01 |
| 5,235,481 A | | 8/1993 | Kamo et al. | 360/97.01 |
| 5,315,467 A | * | 5/1994 | Yoshida | 360/265.6 |
| 5,412,522 A | * | 5/1995 | Lockhart et al. | 360/97.01 |
| 5,495,586 A | * | 2/1996 | Adachi et al. | 710/100 |
| 5,532,889 A | * | 7/1996 | Stefansky et al. | 360/97.01 |
| 5,668,682 A | * | 9/1997 | Matsumoto | 360/254.3 |
| 5,694,267 A | | 12/1997 | Morehouse et al. | 360/97.02 |
| 5,739,995 A | * | 4/1998 | Ohmi et al. | 360/137 |
| 5,835,310 A | * | 11/1998 | Battu et al. | 360/264.7 |
| 6,201,691 B1 | * | 3/2001 | Nagarajan | 361/685 |

* cited by examiner

*Primary Examiner*—Jefferson Evans
(74) *Attorney, Agent, or Firm*—Dicke, Billig & Czaja, PLLC

(57) ABSTRACT

Disclosed is a magnetic storage cartridge adapted to be removably received by a drive base. The magnetic storage cartridge comprises a housing that includes at least one magnetic disk rotatable about an axis, and an actuator arrangement pivotal about an axis. The actuator arrangement includes at least one read/write head for reading and writing information to and from the at least one magnetic disk. The housing also includes a first engagement feature positioned on the housing at the rotational axis of the magnetic disk and a second engagement feature positioned on the housing at the pivot axis of the actuator arrangement. The housing of the storage cartridge also includes a third engagement feature that is spaced from the first and second engagement features. The first, second and third engagement features adapted to be engaged by a corresponding first, second and third engagement features of the disk drive base to secure the magnetic storage cartridge to the disk drive base and substantially minimize performance degrading vibrations during operation of the magnetic storage cartridge.

20 Claims, 18 Drawing Sheets

DISK DRIVE SYSTEM WITH ENCLOSED REMOVABLE CARTRIDGE INCLUDING VOICE COIL/HEAD/DISK ASSEMBLY

CROSS REFERENCE TO RELATED APPLICATIONS

This Non-Provisional Utility Patent Application claims the benefit of the filing date of U.S. Provisional Application Serial No. 60/212,040, filed Jun. 16, 2000, entitled "DISK DRIVE SYSTEM WITH ENCLOSED REMOVABLE CARTRIDGE OF VOICE COIL/HAD/DISK ASSEMBLY."

TECHNICAL FIELD

This invention relates generally to disk drive storage systems. In particular, the present invention is a disk drive system with a removable and exchangeable cartridge incorporating magnetic media, head and voice coil assemblies. The disk drive system includes a plurality of mechanical engagement features arranged in a triangular pattern for engaging the removable cartridge and preventing movement of the cartridge during operation of the disk drive system. The mechanical engagement features supporting adaptive magnetic and electrical engagement features which enable operation of the disk drive system.

BACKGROUND OF THE INVENTION

Disk drive systems of the "Winchester" type are well known in the industry. A disk drive system of this type typically includes a head disk assembly and a printed circuit board (PCB) assembly for controlling operation of various components of the head disk assembly. The head disk assembly generally includes an enclosure which houses a magnetic disk arrangement, a magnetic transducer arrangement, a rotary actuator arrangement and a spindle motor arrangement. The magnetic disk arrangement is defined by one or more rigid disks coated with a magnetizable medium for storage of digital information in a plurality of circular, concentric data tracks. The disks are driven (i.e., rotated) by the spindle motor arrangement to spin, and thereby cause the surfaces of the disks to pass under respective read and write transducers of the magnetic transducer arrangement. The read and write transducers write information to and read information from the concentric data tracks in the disk surfaces of the rigid disks. There is typically one read and write transducer for each recording surface of each rigid disk.

The rotary actuator arrangement moves the read and write transducers from track to track cross the surfaces of the rigid disks under control of circuitry. The rotary actuator arrangement typically includes a permanent-magnet arrangement, a pivot bearing cartridge and a head stack assembly. The pivot bearing cartridge includes a stationary shaft secured to the enclosure to define an axis of rotation for the head stack assembly. The head stack assembly, often referred to as an "E-block" includes a flex circuit assembly, a voice coil and track accessing arms. Each one of the read and write transducers is secured to a respective one of the track accessing arms. During use, circuitry causes current to conduct through the voice coil, and because the voice coil lies in the magnetic field provided by the permanent-magnet arrangement, a torque is applied to the head stack assembly. The amount and direction of that torque is subject to control by a servo system that controls the rotary position of the read and write transducers relative to tracks on the respective recording surfaces of the rigid disks. Track accessing is limited to a certain range of disk tracks from an inner radius to an outer radius of the rigid disks by limiting the pivotal movement of the head stack assembly via a set of crash stop assemblies.

In a standard "Winchester" disk drive system, all the major sub-components, including the PCB assembly, rigid disks, the head stack assembly, the read and write transducers, the permanent magnets, the spindle motor, and crash stop assemblies are all mounted onto a drive base and cover that defines the enclosure. This enclosure is sealed to provide a relatively contaminant-free interior for these sub-components. Because of the need to maintain this contaminant free environment within the enclosure, these sub-components, particularly the disks, are not readily removable from the disk drive system enclosure.

The disk drive system, which includes the enclosure and sub-components, is typically rigidly mounted to a computer system housing so as not to be removable from the computer housing and therefore, so as not to be exchangeable with other disk drive systems, even of the same type. However, there are some disk drive systems that are meant to be readily removable and exchangeable. In either case during operation it is necessary that for the disk drive system to be rigidly mounted to the computer housing in a fixed position so as to prevent any "play" (i.e., movement) of the disk drive system. This "play", whether side-to-side or up-and-down, is caused by vibration as a result of operation of other systems within the computer housing and/or operation of the sub-components within the disk drive system itself. This vibration can be due to or cause undesirable imbalances in the magnetic disk arrangement because of the high rotational speeds of the rigid disks. In addition, this vibration can be due to or cause undesirable imbalances in the rotary actuator arrangement which can cause actuator tracking problems that can result in the actuator arrangement taking longer to find the desired track on a rigid disk. As such, vibration causing "play" can degrade the overall performance of the disk drive assembly. Hence, for proper operation of the disk drive system, it is necessary to rigidly mount the disk drive system to prevent unwanted "play". Moreover, in the case where the disk drive system is designed to be readily removable and exchangeable, it is exceedingly necessary to rigidly secure the readily removable and exchangeable portion of the disk drive system against unwanted movement (i.e., "play") during operation of the disk drive system.

One non-readily removable and non-readily exchangeable "Winchester" disk drive system as described above is disclosed in U.S. Pat. No. 4,317,146 to Gervais et al. In Gervais et al., in contrast to what is described above, a stepper motor rather than a voice coil is used to actuate the track accessing arms of the head stack assembly.

The U.S. Pat. No. 5,235,481 to Kamo et al., discloses a readily removable and exchangeable disk drive system. In Kamo et al., a separate cartridge, which houses a disk/hub assembly, a head/arm assembly with a pivot, and a polarized magnet assembly, is readily removable from its drive and exchangeable with other drives. However, in Kamo et al., the separate cartridge is not adequately rigidly secured within the drive so as to prevent vibration causing degradation in disk drive performance.

The U.S. Pat. No. 4,359,762 to Stollorz discloses a readily removable and exchangeable disk drive system. In Stollorz, a separate storage module, which houses a disk/hub assembly and a head/arm assembly, is readily removable from its drive module so as to be exchangeable with other like drive modules. In Stollorz an external linear screw translation system drives and controls the head arm assembly. However, in Stollorz, like Kamo et al., the separate storage module is not adequately rigidly secured within the drive module so as to prevent vibration causing degradation in disk drive performance.

The U.S. Pat. No. 5,214,550 to Chan discloses a readily removable and exchangeable disk drive system similar to Kamo et al. As such, like Kamo et al. and Stollorz, the separate cartridge is not adequately rigidly secured within the drive so as to prevent vibration causing degradation in disk drive performance.

The U.S. Pat. Nos. 4,974,103; 4,965,691; and 5,175,657 to Iftikar discloses a readily removable and exchangeable disk drive system. In Iftikar a separate cartridge encloses transducer heads, a disk and its spindle translator, and one or more of actuators, either voice coil or magnets. The edges of the separate cartridge are locked in position via a pair of tracks in the drive housing's interior with the separate cartridge's middle portion suspended in the air. The rotation of the disk spindle inside the cartridge is actuated by a rotating magnetic field generated by a fixed coil assembly distanced from the cartridge's disk spindle. Such a rotating magnetic field not only would induce the rotation of the disk spindle, but also unwanted vertical and horizontal vibrations of the separate cartridge. These vibrations can lead to many technical problems such as recording track mis-registration, modulation and noise which are critical to high density, high performance recording. Also, a connector connecting the electronic components inside the removable cartridge to the drive base system lack essential features for preventing static electrical charges which can be very damaging to the read/write heads and the pre-amplifier chip.

The U.S. Pat. No. 5,694,267 to Morehouse et al. discloses a readily removable and exchangeable disk drive system. In Morehouse et al., a separate cartridge, which houses a disk/hub assembly, a head/arm assembly is readily removable from its drive and exchangeable with other drives. While the disk media, when not used, are mechanically enclosed inside the cartridge via a shutter system similar to a floppy disk, cartridge shuttering during loading and unloading of the cartridge can generate particles and thereby contaminate the cartridge and the head/disk interfaces. As such, when the drive operates, the disk assembly, along with the heads, are exposed to the drive environment and airflow inside the cartridge is not properly shrouded so as to prevent turbulence which can negatively affect the seeking and tracking performance of the transducer heads. In addition, the separate cartridge is not adequately rigidly secured within the drive so as to prevent vibration causing degradation in disk drive performance.

There is a need for improved disk drive systems. In particular, there is a need for a disk drive system that includes a readily removable and exchangeable magnetic disk drive cartridge, housing a disk/hub assembly and a head/arm assembly, with the disk drive cartridge being adequately rigidly secured within the drive housing so as to prevent vibration causing degradation of disk drive performance. Moreover, the disk drive cartridge should be adequately sealed to prevent contamination by particles and other contaminants that can adversely affect performance. In addition, the disk drive cartridge should prevent air turbulence which can negatively affect the seeking and tracking performance of the transducer heads.

SUMMARY OF THE INVENTION

The present invention is a magnetic storage cartridge adapted to be removably received by a disk drive assembly. The magnetic storage cartridge comprises a housing that includes at least one magnetic disk rotatable about a first axis, and an actuator arrangement pivotal about a second axis. The actuator arrangement includes at least one read/write head for reading and writing information to and from the at least one magnetic disk. The housing also includes a first engagement feature positioned on the housing at a vibration source. The first engagement feature adapted to be engaged by a first corresponding engagement feature of the disk drive assembly to secure the magnetic storage cartridge to the disk drive assembly and permit operation of the magnetic storage cartridge.

In one aspect of the present invention, the housing further includes a second engagement feature positioned on the housing at a further vibration source. The second engagement feature is adapted to be engaged by a second corresponding engagement feature of the disk drive assembly to secure the magnetic storage cartridge to the disk drive assembly and permit operation of the magnetic storage cartridge. The first engagement feature is coincident with the first axis and the second engagement feature is coincident with the second axis. In a further aspect of the present invention, the housing further includes a third engagement feature. The third engagement feature is adapted to be engaged by a third corresponding engagement feature of the disk drive assembly to secure the magnetic storage cartridge to the disk drive assembly and permit operation of the magnetic storage cartridge. This third engagement feature is spaced from the first and second axes. In this further aspect of the present invention, the first, second and third engagement features are arranged in a triangle.

In another embodiment, the present invention provides a magnetic storage cartridge adapted to be removably received by a disk drive assembly. The magnetic storage cartridge comprises a housing that includes at least one magnetic disk and an actuator arrangement. The magnetic disk includes information critical to operation of the magnetic storage cartridge. The actuator arrangement includes at least one read/write head for reading and writing information to and from the at least one magnetic disk. The at least one read/write head upon insertion of the magnetic storage cartridge into the disk drive assembly accesses the information critical to operation of the magnetic storage cartridge to insure proper operation of the magnetic storage cartridge.

In a further embodiment, the present invention provides a disk drive assembly for removably receiving a magnetic storage cartridge having a first major surface and an opposite second major surface. The disk drive assembly comprises a housing configured for receiving the magnetic storage cartridge. The housing includes a first member, and a second member movable relative to the first member. The first and second members have an undocked state, wherein the second member is spaced from the first member by a first distance and the magnetic storage cartridge can be inserted to and removed from the housing, and a docked state, wherein the second member has been moved towards the first member so as to be spaced from the first member by a second distance less than the first distance, and wherein the first and second members engage the first and second major surfaces of the magnetic storage cartridge to secure the magnetic storage cartridge within the housing to permit operation of the magnetic storage cartridge.

In one aspect of this further embodiment, both the first and second members are movable. These first and second members are movable linearly in a direction substantially perpendicular to the first and second major surfaces of the magnetic storage cartridge. In a further aspect of this further embodiment, the first member is linearly movable in a first direction and the second member is linearly movable in a second direction substantially perpendicular to the first direction. In still a further aspect of the present invention, the first and second members are pivotally movable.

By engaging and securing the magnetic storage cartridge at its primary sources of vibration, the readily removable and exchangeable magnetic storage cartridge is rigidly secured within the base drive housing so as to substantially minimize vibrations that may cause a degradation in disk drive performance. In particular, the upper and lower plates of the base drive engage the magnetic storage cartridge at the rotational axes of the magnetic disk and the actuator arrangement as well as a third point to ensure a stable and secure mounting arrangement for the readily removable and exchangeable magnetic storage cartridge. Moreover, this mounting arrangement helps reduce the noise level of the magnetic storage cartridge, and helps absorb undesirable heat due to the rotation of the magnetic disk by conducting this heat out of the cartridge and to the upper and lower plate members. This mounting arrangement also allows the magnetic storage cartridge to be adequately sealed to prevent contamination by particles and other contaminants that can adversely affect performance. In addition, sealing of the magnetic storage cartridge substantially minimizes air turbulence which can negatively affect the seeking and tracking performance of transducer heads. Lastly, by pre-writing operational information related to the magnetic storage cartridge to the magnetic disk, or an enclosed semiconductor memory chip, this pre-written operational information can be accessed to achieve the optimal read/write and error-rate performance particular to the magnetic storage cartridge accepted by the base drive.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principals of the invention. Other embodiments of the present invention and many of the intended advantages of the present invention will be readily appreciated as the same become better understood by reference to the following detailed description when considered in connection with the accompanying drawings, in which like reference numerals designate like parts throughout the figures thereof, and wherein.

DETAILED DESCRIPTION OF THE PREFERRED EMBODIMENTS

Figure 1:
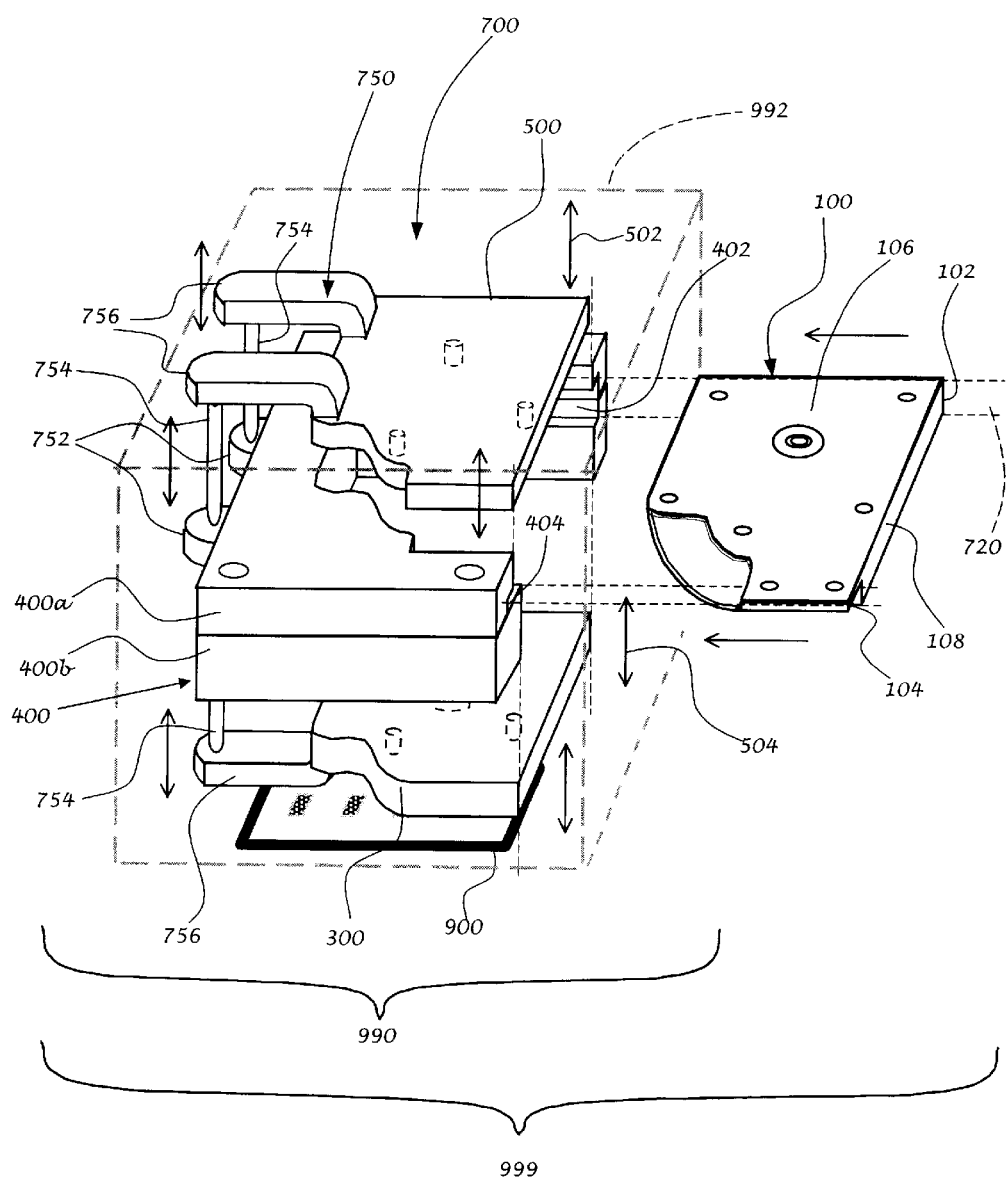
FIG. 1 is a perspective of a complete disk drive system with a readily removable and exchangeable magnetic storage cartridge, enclosing a voice coil/head/disk assembly, being translated into a drive base by way of a loading mechanism in accordance with a preferred embodiment of the present invention.

A preferred embodiment of a disk drive system 999 including a drive base 990 and a readily removable and exchangeable magnetic storage cartridge 100 in accordance with the present invention is illustrated generally in FIG. 1. The drive base 990 includes a housing 992 (shown in dashed lines for clarity) that encloses a permanent magnet rack assembly 400, a print circuit board assembly (PCBA) 900, and a cartridge loading/unloading assembly 700. The cartridge loading/unloading assembly 700 is defined by an upper plate 500, a lower plate 300, and a translation mechanism 750.

Figure 1A:
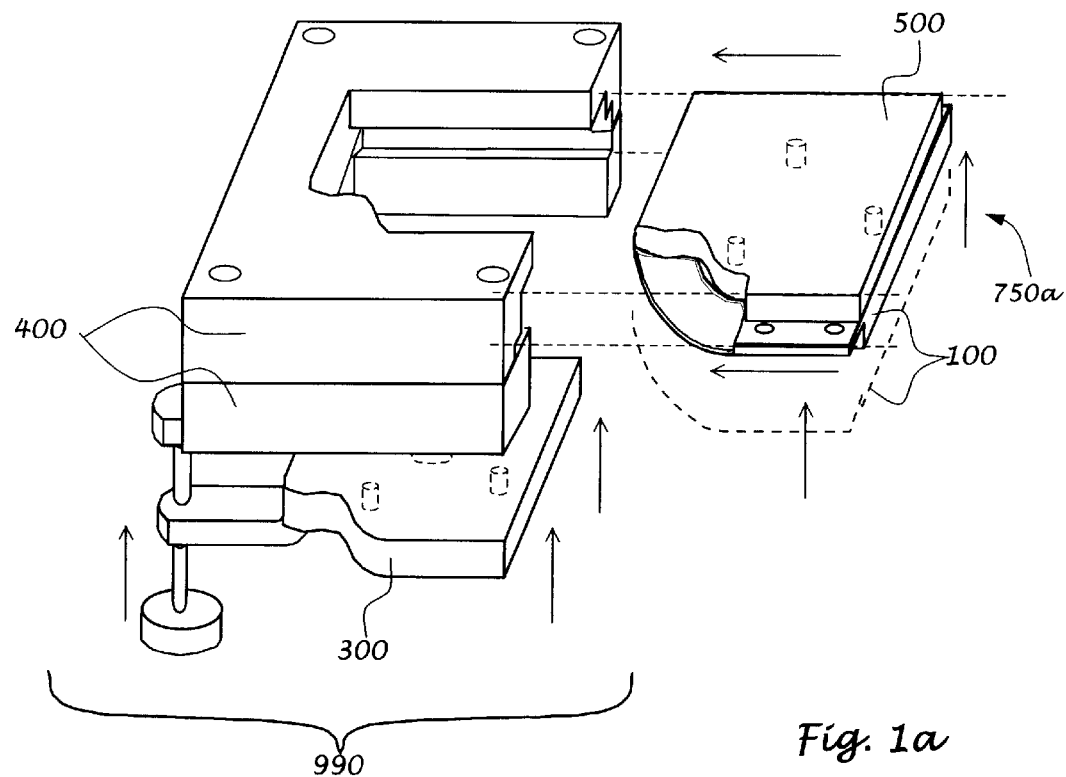
FIG. 1a is a perspective view similar to FIG. 1 of a further embodiment of the loading mechanism for translating the magnetic storage cartridge into and out of the drive base in accordance with the present invention.
Figure 1B:
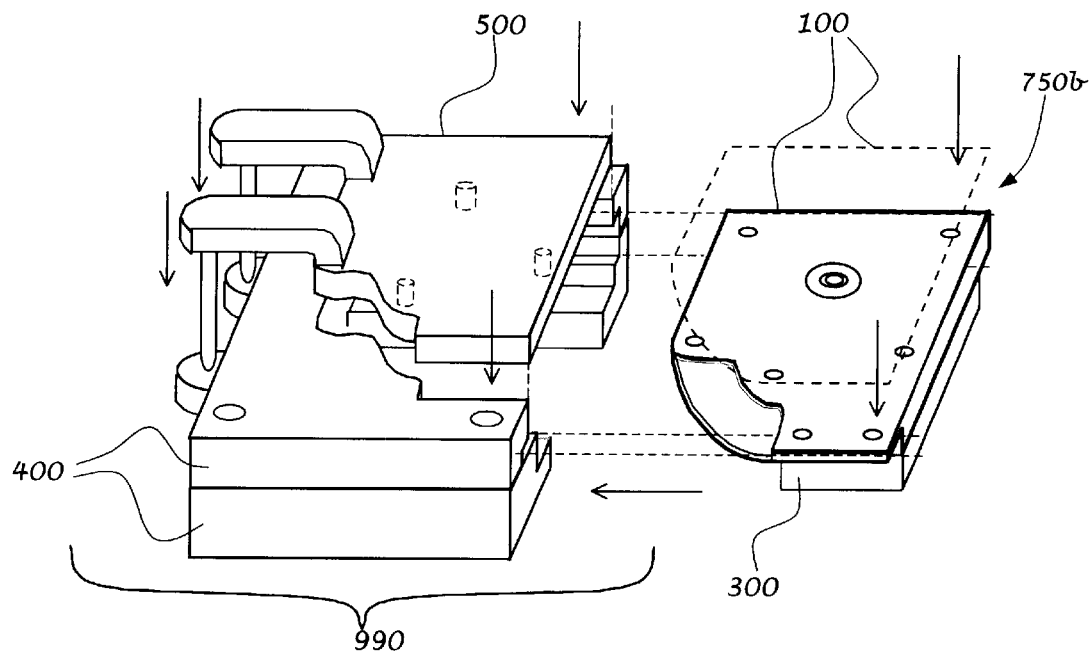
FIG. 1b is a perspective view similar to FIG. 1a of another embodiment of the loading mechanism for translating the magnetic storage cartridge into and out of the drive base in accordance with the present invention.
Figure 1C:
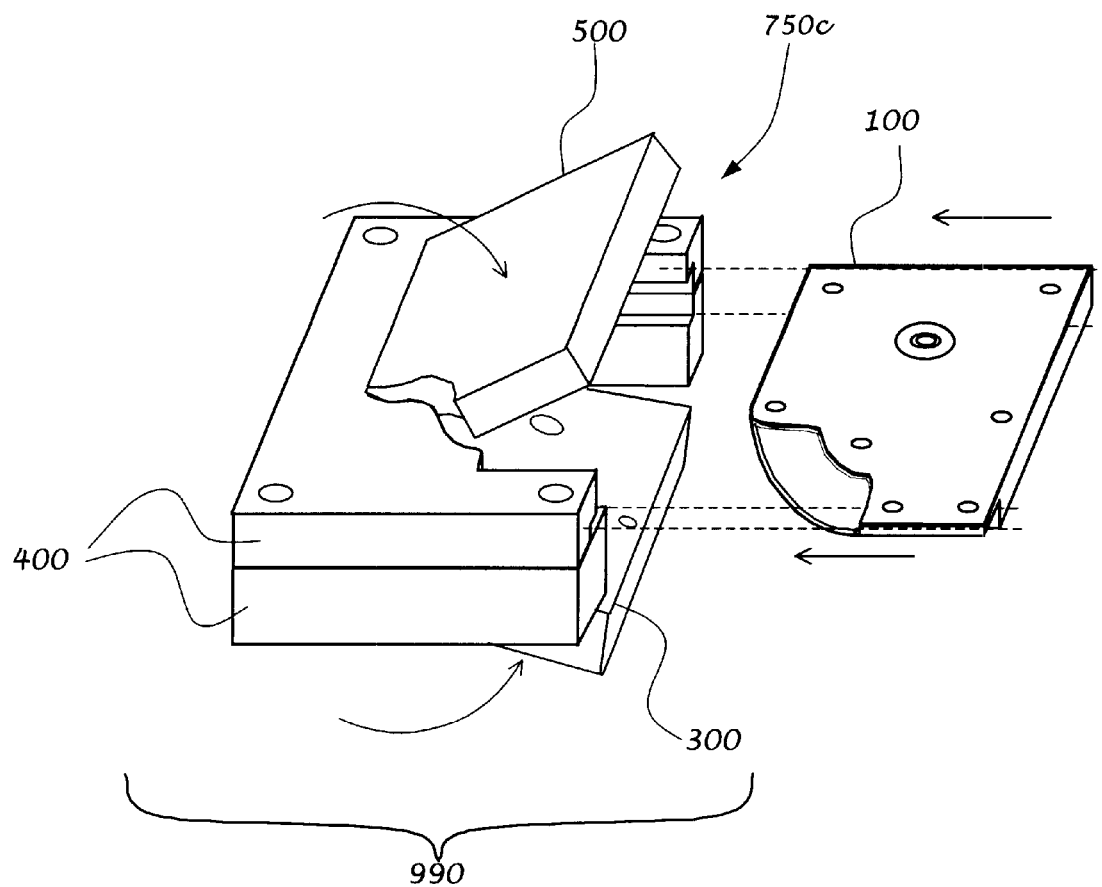
FIG. 1c is a perspective view of still another embodiment of the loading mechanism for translating the magnetic storage cartridge into and out of the drive base in accordance with the present invention.
Figure 2:
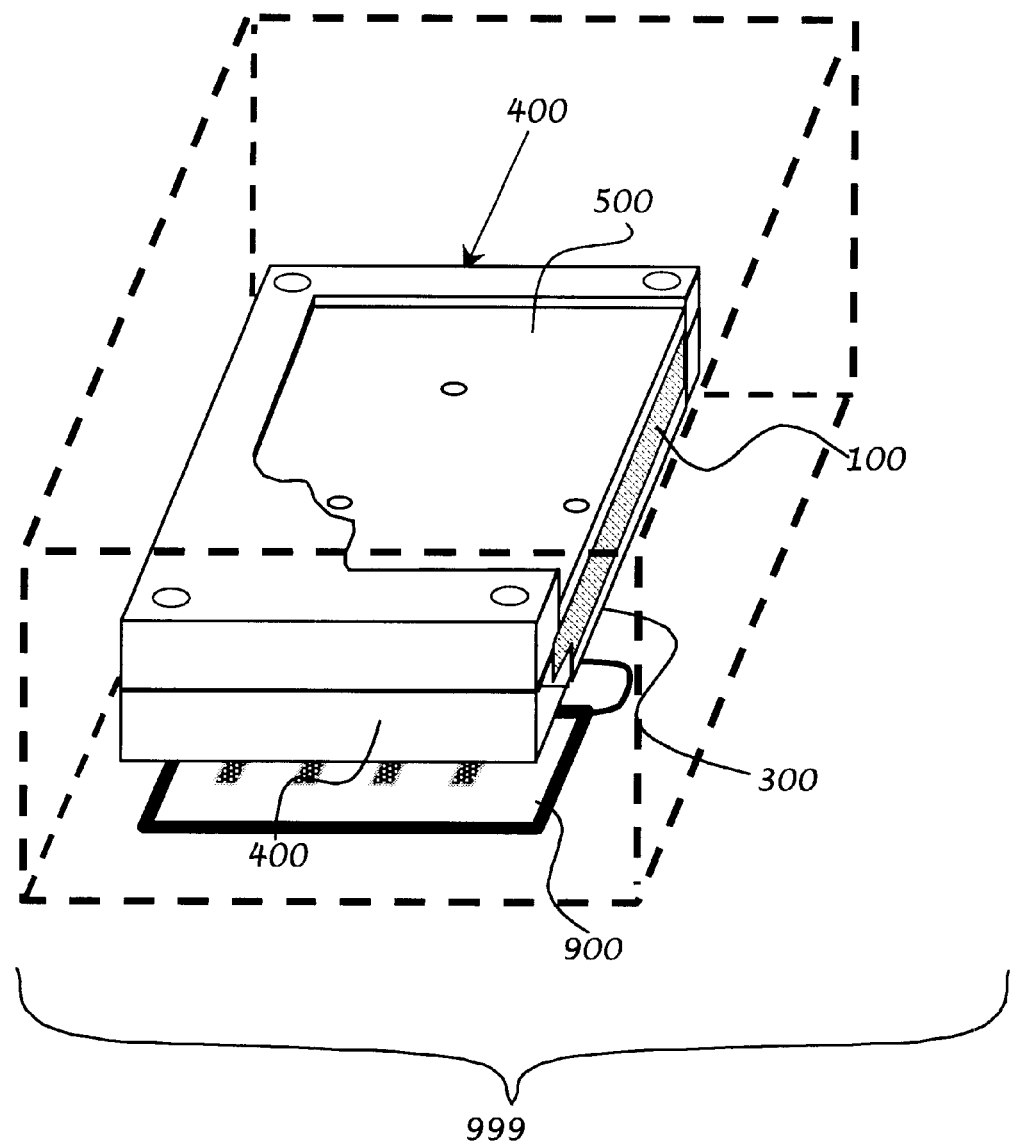
FIG. 2 is perspective view of the embodiments of FIGS. 1, 1a, 1b and 1c illustrating the disk drive system with the magnetic storage cartridge fully engaged with the drive base in a desired engagement configuration for magnetic recording/retrieving operation in accordance with the present invention.
Figure 2A:
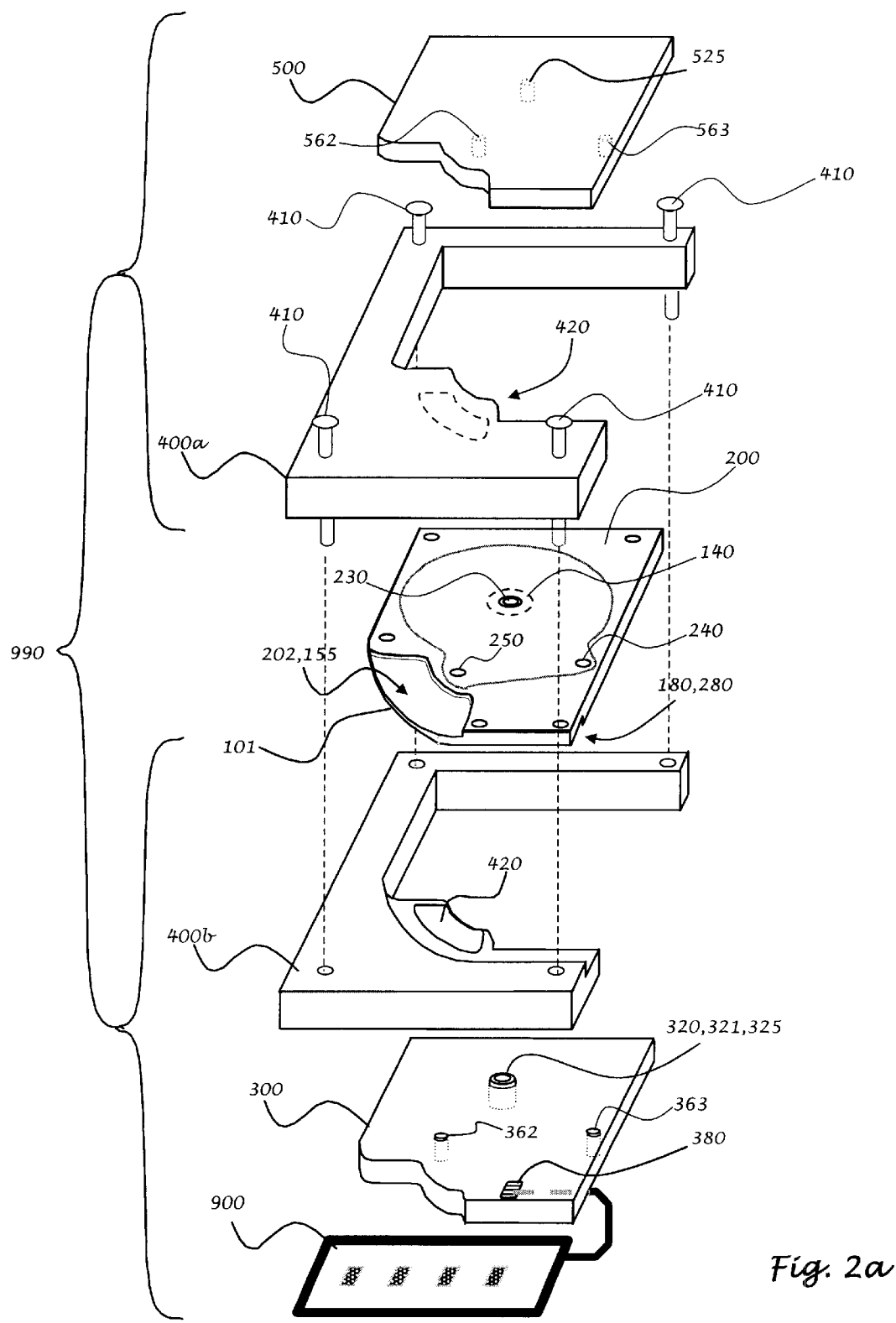
FIG. 2a is an exploded perspective view of the disk drive system illustrated in FIG. 2.

As seen in FIG. 2a, in several embodiments of the present invention illustrated in FIGS. 1, 1a, 1b and 1c, the permanent magnet rack assembly 400 is defined by an upper rack member 400a and a lower rack member 400b. The upper and lower rack members 400a and 400b are secured together by a plurality of threaded fasteners 410 so as to define a single unitary structure. As seen in FIG. 1, the unitary rack assembly 400, formed by the upper and lower rack members 400a, 400b defines a first wide slot 402 and a second narrow slot 404 for receipt and support of first and second end edges 102 and 104 of the magnetic storage cartridge 100. The difference in the size of the first and second slots 402 and 404 insures that the magnetic storage cartridge 100 is insert into the rack assembly 400 in the correct orientation. As seen in FIG. 2a, each rack member 400a, 400b includes a polarized magnet 420 whose purpose will be made clear below. In an alternative embodiment of the invention, only a single magnet 420 is mounted on either one of the rack members 400a, 400b. In the preferred embodiment, the storage cartridge 100 is inserted to and removed from the rack assembly 400 manually by a user. Alternatively, the storage cartridge 100 is inserted to and removed from the rack assembly 400 by an electric-mechanical linear translation mechanism 720 (shown in dashed lines). In one preferred embodiment the upper and lower rack members 400a, 400b are made of metal, such as aluminum or steel.

In the preferred embodiment illustrated in FIG. 1, the upper plate 500 is linearly movable in the direction of double headed arrow 502, and the lower plate 300 is linearly movable in the direction of double headed arrow 504 via operation of the translation mechanism 750. The translation mechanism 750 in one preferred embodiment includes a plurality of stepper motors 752 that power drive screws 754 that engage brackets 756 secured to the upper and lower plates 500, 300 to move the plates 500, 300 between an undocked state, wherein the lower plate 300 is spaced from the upper plate 500 by a first distance (see FIG. 1) and the magnetic storage cartridge 100 can be inserted to and removed from the rack assembly 400, and a docked state, wherein the upper and lower plates 500, 300 have been moved towards one another so that the upper and lower plates 500, 300 are spaced from one another by a second distance (see FIG. 2) less than the first distance, and wherein the upper and lower plates 500, 300 engage first and second major surfaces 106 and 108 of the magnetic storage cartridge 100 to secure the magnetic storage cartridge 100 within the rack assembly 400 to permit operation of the magnetic storage cartridge 100. In particular, to engage the cartridge 100, the upper plate 500 is moved downwards and the lower plate 300 is moved upwards. To disengage the cartridge 100, the above process is simply reversed. Alternatively, the upper and lower plates 500, 300 can be moved manually by a user to completely engage and disengage the cartridge 100 placed within the rack assembly 400. Other embodiments of the present invention include any modification or extension from the aforementioned. One of such modification is that the cartridge 100 can be inserted to and removed from the rack assembly 400 from an end or the back side of the housing 952 of and the drive base 990, instead of from the side as illustrated in FIG. 1.

FIG. 1a illustrates an alternative embodiment translation mechanism 750a for loading and unloading the cartridge 100 to and from the rack assembly 400. In this alternative translation mechanism 750a the cartridge 100 is first engaged with the upper plate 300, and is then linearly translated together with the upper plate 300 into the drive base rack assembly 400 and then the bottom of the cartridge 100 is engaged by the drive base lower plate 500 as the lower plate 500 is moved upwards.

FIG. 1b illustrates a further alternative embodiment translation mechanism 750b for loading and unloading the cartridge 100 to and from the rack assembly 400. In this further alternative translation mechanism 750b, the cartridge 100 is first engaged with the lower plate 500, and is then linearly translated together with the lower plate 500 into the drive base rack assembly 400 and then the top of the cartridge 100 is engaged by the drive base upper plate 300 as the upper plate 300 is moved downwards.

FIG. 1c illustrates another alternative embodiment translation mechanism 750c for loading and unloading the cartridge 100 to and from the rack assembly 400. In this another alternative translation mechanism 750c, the cartridge 100 is first placed into the rack assembly 400 of the drive base 990. Then the lower plate 500 and upper plate 300 plate of the drive base 990 are rotated, centered at two separated axes but in parallel, to engage with the cartridge 100.

As seen in FIG. 2a, the cartridge 100 is placed into the rack assembly 400 with its rounded corner 101 sandwiched by the pair of polarized magnets 420 mounted to the magnet rack assembly 400. The drive upper plate 500 and the lower plate 300 together sandwich the cartridge 100 on its top (i.e., first major surface 106) and bottom (i.e., second major surface 108). To substantially prevent movement of the cartridge 100 relative to the upper and lower plates 500, 300 and the rack assembly 400, the upper plate 500 and the lower plate 300 each include a plurality of engagement features. As seen in FIG. 2a, the upper plate 500 includes a first engagement feature or pin 525, a second engagement feature or pin 562 and a third engagement feature or pin 563 which are arranged to define a triangle. The first engagement feature 525 is adapted to engage a first corresponding engagement feature or aperture 230 in the cover 200 (see FIG. 3) of the cartridge 100 (see FIG. 6). The first corresponding engagement feature 230, and thereby the first engagement feature 525, is coincident with the axis of rotation of the disk spindle 118 of the spindle assembly 140 of the magnetic disk 170 and a primary source of vibration of the cartridge 100. The second engagement feature 562 is adapted to engage a second corresponding engagement feature or aperture 250 in the cover 200 (see FIG. 3) of the cartridge 100 (see FIG. 6b). As seen best in FIG. 3, the second corresponding engagement feature 250, and thereby the second engagement feature 562, is coincident with the pivot axis 158 of the voice coil/head/disk assembly 150 and a further source of vibration of the cartridge 100. Lastly, the third engagement feature 563 is adapted to engage a third corresponding engagement feature or aperture 240 in the cover 200 (see FIG. 3) of the cartridge 100 (see FIG. 6c). The third corresponding engagement feature 240, and thereby the third engagement feature 563, is positioned outside of the surface area of the magnetic disk 170.

As seen in FIG. 2a, the lower plate 300 includes a spindle motor 321 having a spindle translator 320 emerging from the top surface of the lower plate 300. The spindle translator 320 is releasably engageable with the spindle 118 of the spindle assembly 140 of the magnetic disk 170 of the cartridge 100. A first engagement feature or spindle-docking device 325 of the lower plate 300 is concentric to the spindle translator 320 on the lower plate 300. This spindle-docking device 325 (i.e., first engagement feature of the lower plate 300) is adapted to engage a first corresponding engagement feature or aperture 130 in the base 110 (see FIG. 4f) of the cartridge 100 (see FIG. 6). The first corresponding engagement feature 130, and thereby the first engagement feature 325, is coincident with the axis of rotation of the disk spindle 118 of the magnetic disk 170 and a primary source of vibration of the cartridge 100. When the cartridge 100 is engaged by the upper and lower plates 500, 300 the disk spindle 140 of the cartridge 100 is firmly docked and connected mechanically with the spindle translator 320 which can transfer the rotational motion of the spindle motor 321 mounted onto the lower plate 300 of the drive base 990 to the magnetic disk 170. The lower plate 300 also includes a second engagement feature or pin 362 and a third engagement feature or pin 363. The second engagement feature 362 is adapted to engage a second corresponding engagement feature or aperture 150 in the base 110 (see FIG. 4f) of the cartridge 100 (see FIG. 6b). The second corresponding engagement feature 150, and thereby the second engagement feature 362, is coincident with the pivot axis 158 of the voice coil/head/disk assembly 150 and a further source of vibration of the cartridge 100. Lastly, the third engagement feature 363 is adapted to engage a third corresponding engagement feature or aperture 140 in the base 110 (see FIG. 4f) of the cartridge 100 (see FIG. 6c). The third corresponding engagement feature 140, and thereby the third engagement feature 363, is positioned outside of the surface area of the magnetic disk 170. When the upper and lower plates 500, 300 are engaged with the cartridge 100, the first, second and third engagement features 525, 562, 563 of the upper plate 500 are coincident with the first, second and third engagement features 325, 362, 363 of the lower plate 300. As can be seen in FIG. 2a, the first, second and third engagement features 525, 562, 563 of the upper plate 500, and the first, second and third engagement features 325, 362, 363 of the lower plate 300 are arranged in a triangle to secure the cartridge 100 to the drive base 990 in a stable and rigid manner.

Additional embodiments of this invention envision a reverse configuration in which the spindle translator 320, the spindle motor 321 and the spindle-docking device 325 are built into the upper plate 500 of the drive base 990. Correspondingly, the counterparts, 525, 562 and 563 are switched to the lower plate 300.

Figure 4A:
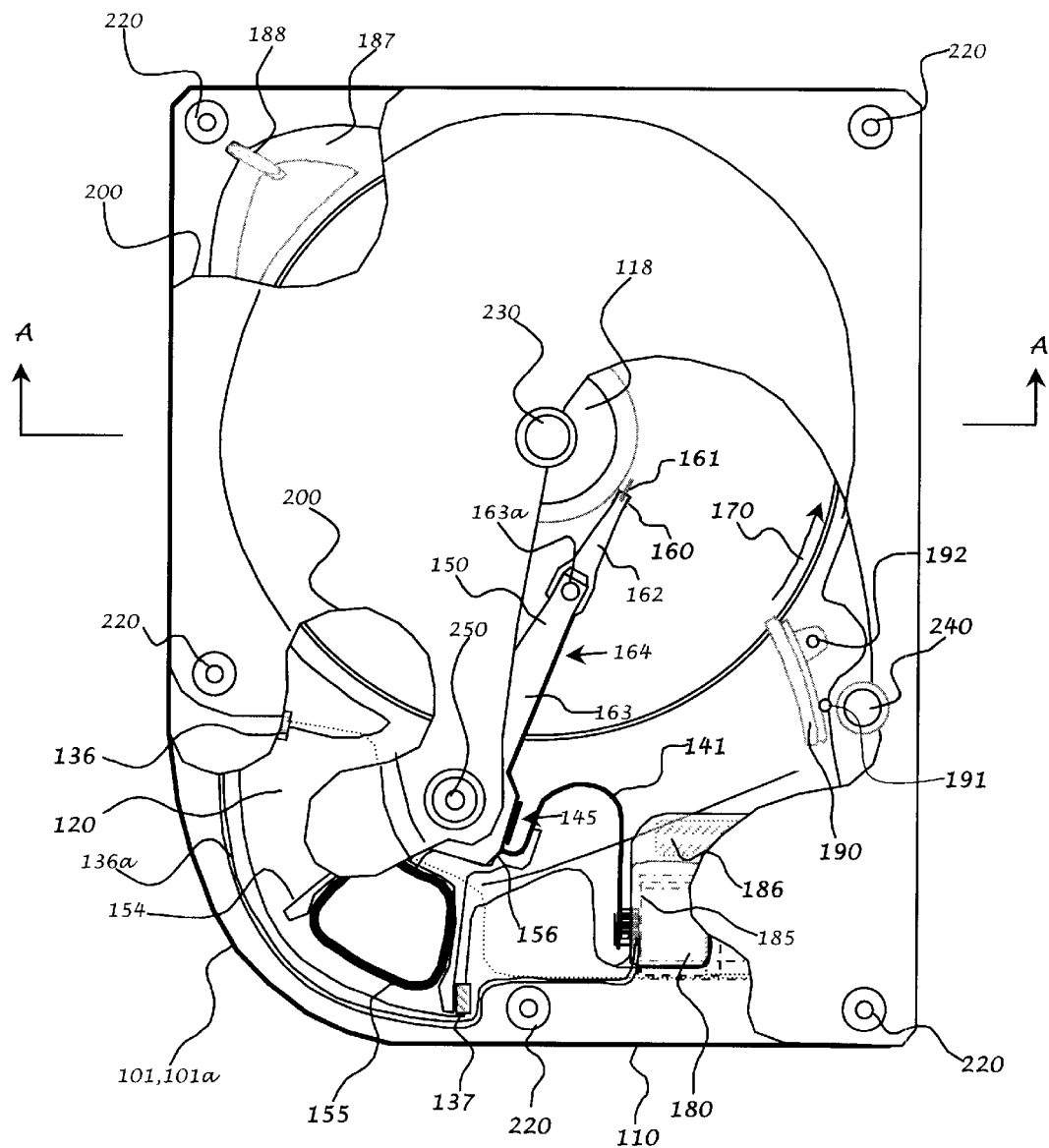
FIG. 4a is a top plan view of the magnetic storage cartridge of the present invention with its cover partially cut off and removed.
Figure 4B:
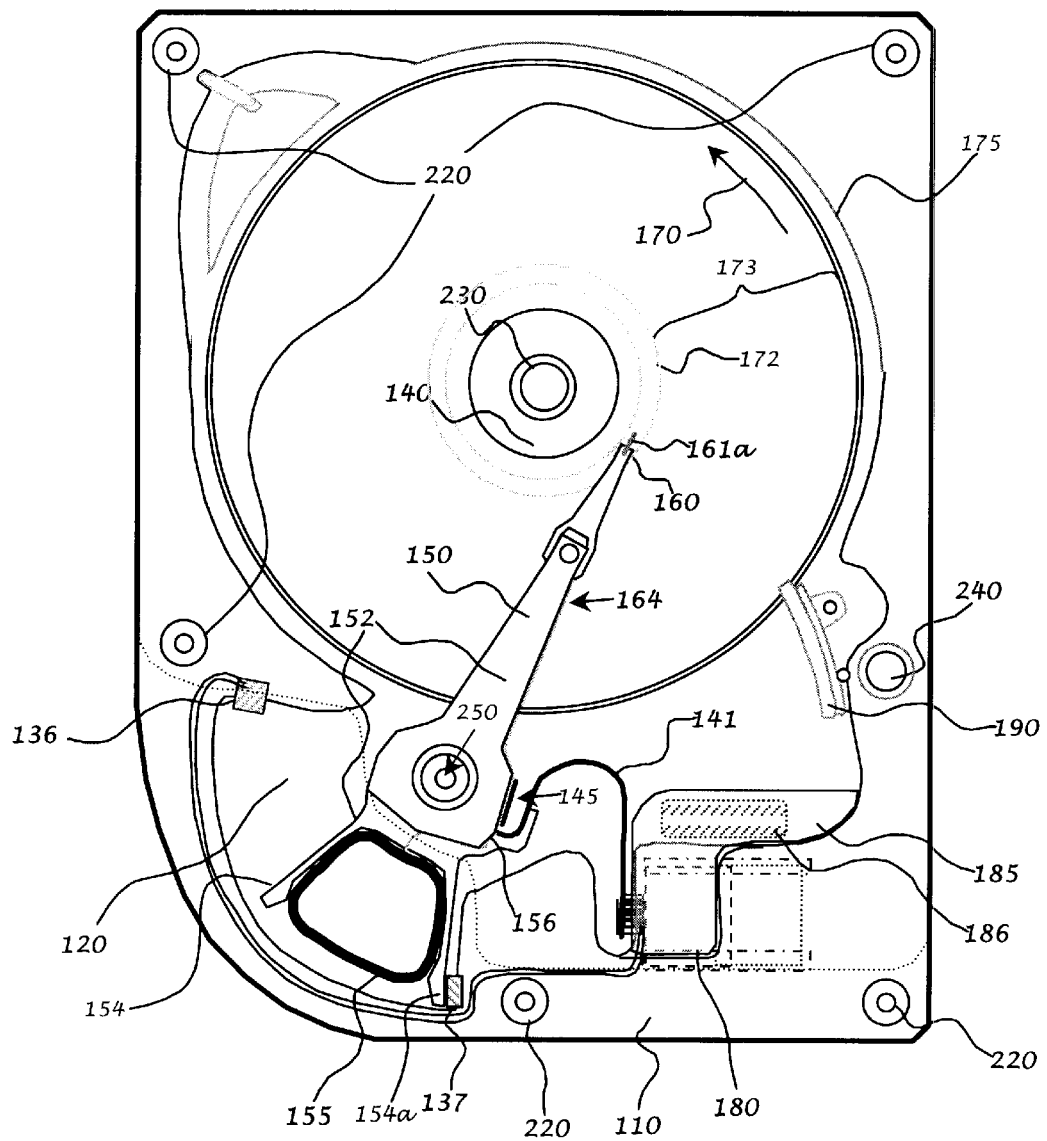
FIG. 4b is a top plan view of the magnetic storage cartridge of the present invention cartridge with its cover removed illustrating the read/write heads flying above the disk surfaces.
Figure 4C:
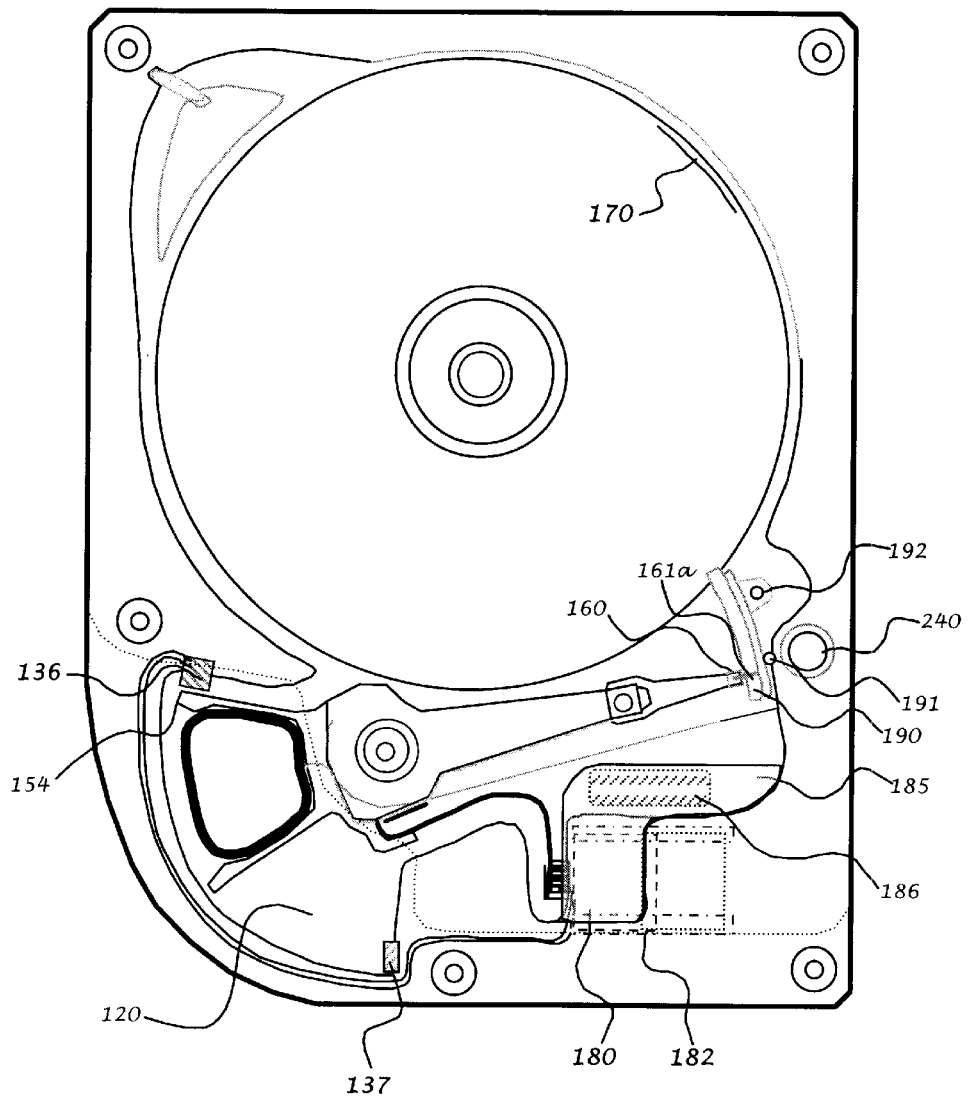
FIG. 4c is a top plan view of the magnetic storage cartridge of the present invention with its cover removed illustrating the read/write heads unloaded and locked onto a set of load/unload ramps.
Figure 4D:
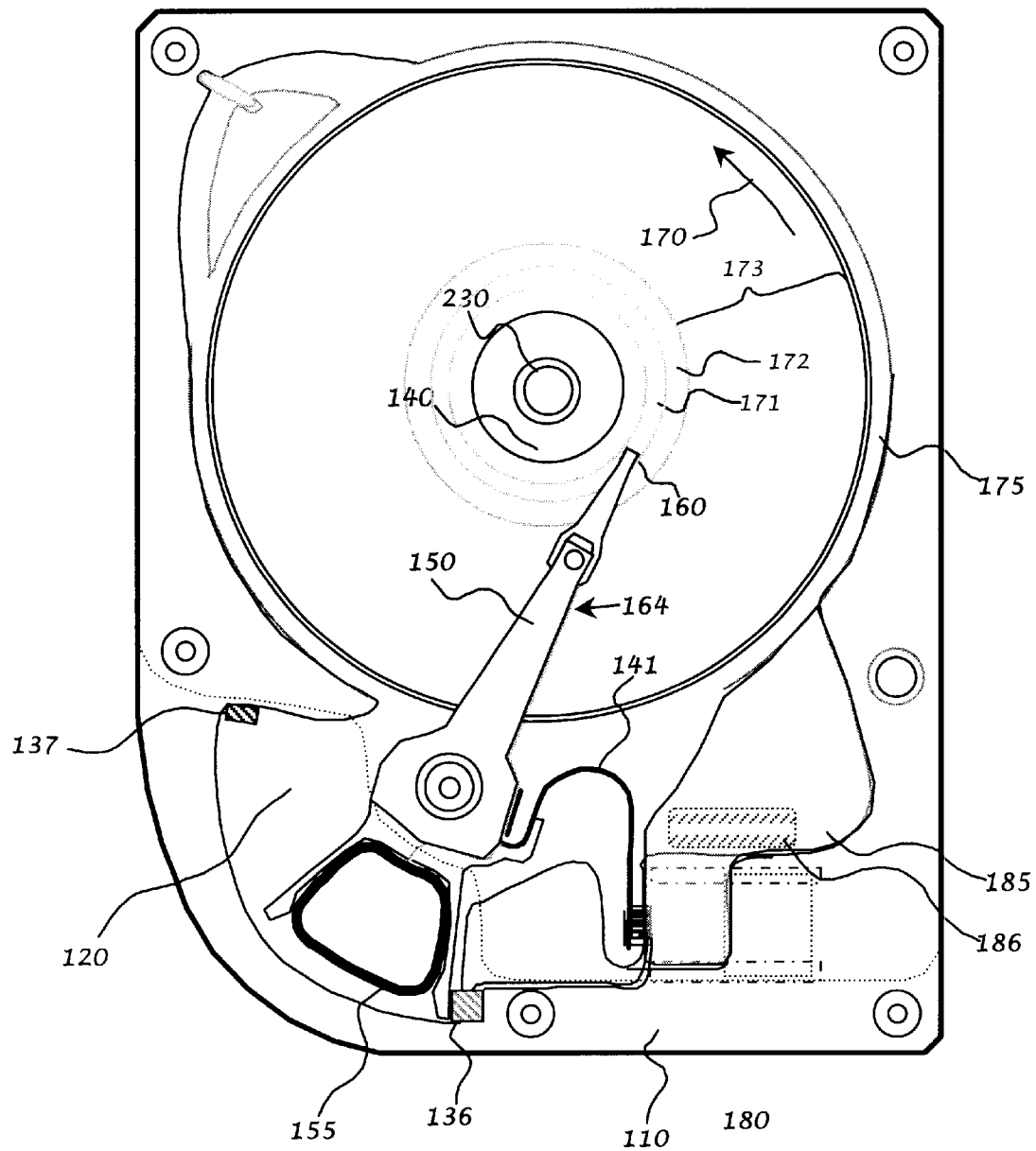
FIG. 4d is a top plan view of the magnetic storage cartridge with the cover removed illustrating an alternative system with the read/write heads parked on the disk surfaces at an inner radius at a contact-stop-start mechanism.
Figure 4E:
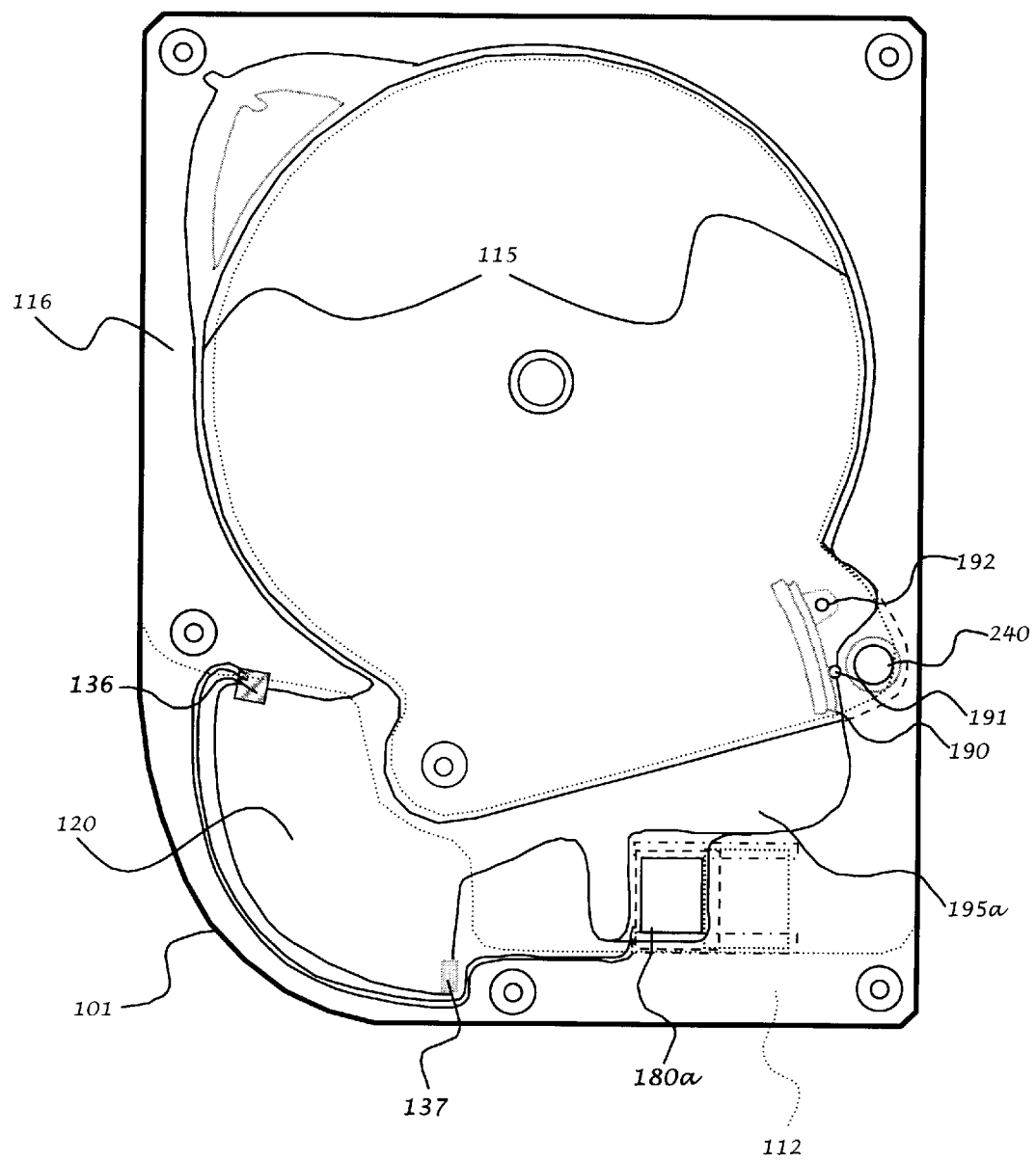
FIG. 4e is a top plan view of the base member of the magnetic storage cartridge of the present invention with the voice coil/head/disk assembly removed.
Figure 4F:
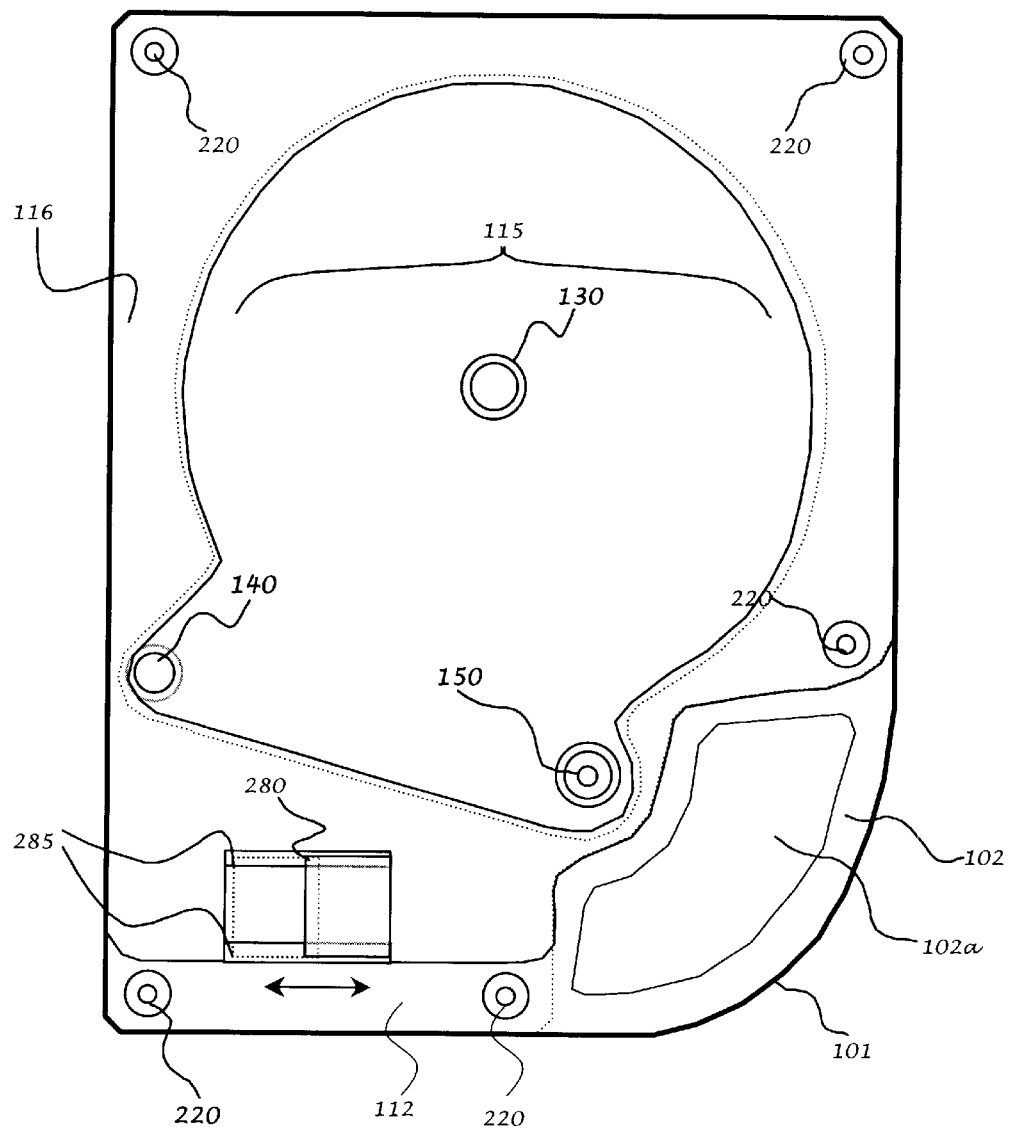
FIG. 4f is a bottom plan view of the base member of the magnetic storage cartridge with the cover and voice coil/head/disk assembly removed showing a shield shutter for an electrical connector.
Figure 4G:
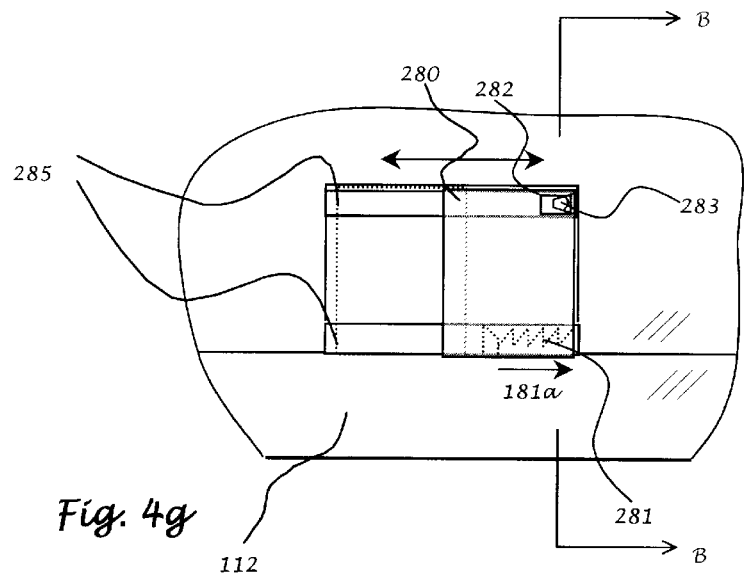
FIG. 4g is an enlarged partial view of the shield shutter shown in FIG. 4f.
Figure 4H:
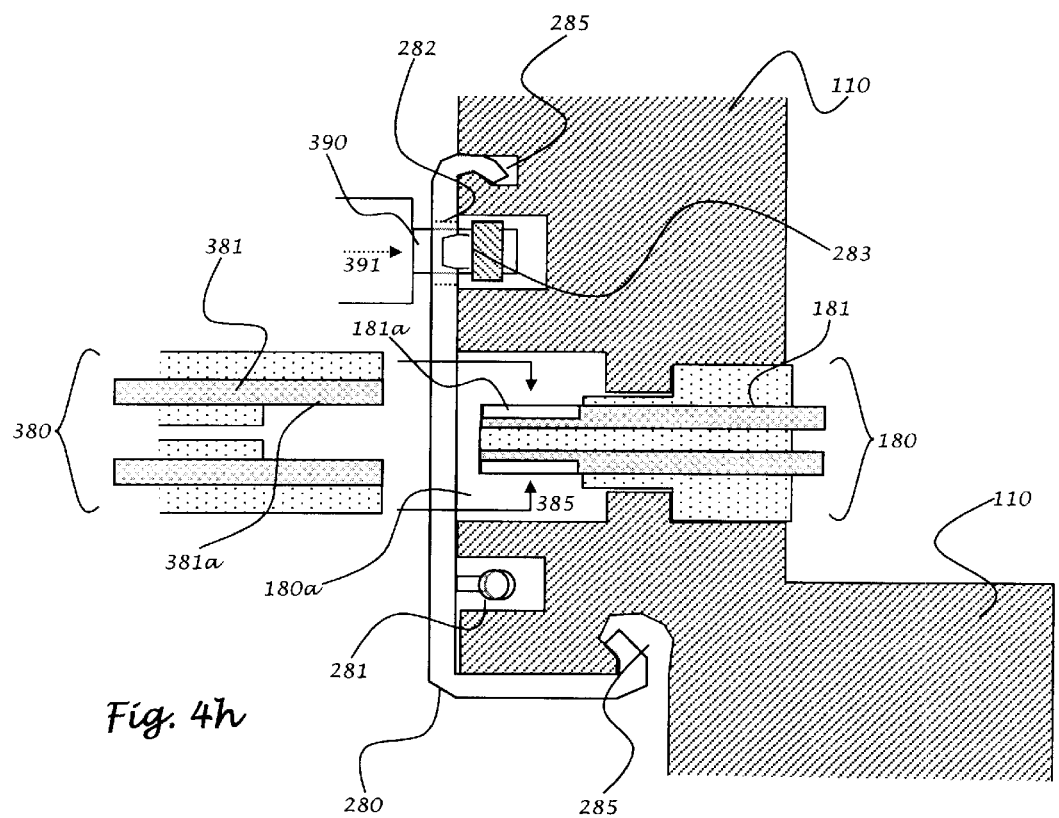
FIG. 4h is a partial cross sectional view taken along line B—B in FIG. 4g illustrating the shield shutter and connector arrangement in accordance with the present invention.

As seen in FIGS. 2a, 4g and 4h, a mother connection pad 380 on top of the lower plate 300 is engaged in electrical connection with an outlet interconnect pad 180 at the bottom of the cartridge 100. The outlet interconnect pad 180 is covered and protected by a shielding shutter 280 prior to the cartridge-to-drive engagement and when the cartridge 100 is removed from the drive base 990. Via the outlet interconnect pad 180, direct electrical current can occur from the PCBA 900 to the voice coil 155 enclosed at the corner 101 of the cartridge 100. Thus, the induced current originating from the magnet pair 420 can actuate the voice coil 155 for pivotal movement centered at the pivot 158 with the help of magnetic flux penetrating through the cover faces 202 over the voice coil 155 at the rounded corner 101 of the cartridge 100.

Figure 3:
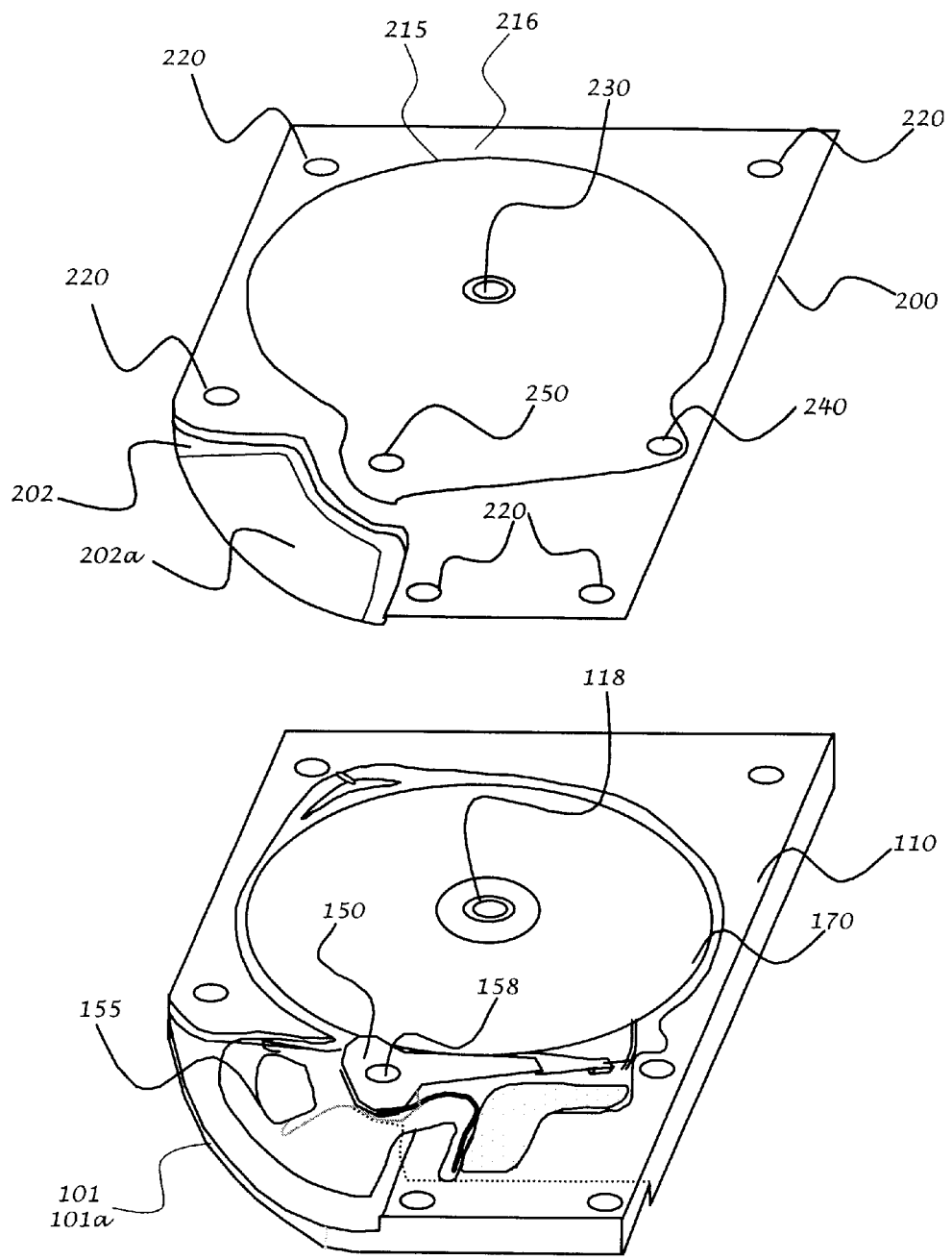
FIG. 3 is a perspective view of the magnetic storage cartridge, with its cover and base detached, in accordance with the present invention.

FIG. 3 is a perspective view of the cartridge 100, with its cover 200 and bottom case 110 detached, according to this invention. The bottom case 110 hosts the magnetic disk 170 mounted onto the disk spindle assembly 118, the voice coil/head stack assembly 150 mounted at its pivot 158. The cartridge cover 200 is mounted onto the bottom case 110 via three main mounting screw assemblies at the disk spindle 230/118, the pivot 250/158 and the third engagement point 240 as well as a set of secondary screws 220.

The corner part 202 at the rounded corner 101 of the cover 200 is either recessed so as to step down closer to the voice coil 155 or made flat with the rest of the top cover 200. This corner part 202, consisting of no ferromagnetic materials, directly interfaces with the magnets 420 of the rack assembly 400. At the center of the corner part 102 includes a thin high magnetic permeable piece 202a, shaped in accordance with the magnets 420 and to interface with the rest of the corner 102. This thin piece 202a has differentially higher magnetic permeability than the rest of the corner part 202 and even the rest of cartridge 100 so as to allow high density magnetic flux from the magnets 420 to penetrate through the thin piece 202a so that the magnetic flux can interact with the voice coil 155 inside the cartridge 100. The round corner 101 of the bottom case 110 is preferably framed with a stiff metal frame 110a made of non-ferromagnetic metal/alloy such as Aluminum, to increase the stiffness of the round corner 101.

As seen in FIG. 3, alternatively, a central piece 215 can be molded/bonded to the surrounding piece 216 of the cover 200. The central piece 215 is preferably made of special metal sheet that can shield both electrical discharge/interference and magnetic flux from encroaching on the interior cavities of the cartridge where the disk and the heads are hosted. The surrounding piece 216 is preferably made of carbon-filled plastic, which can shield electrical discharge in this embodiment.

FIG. 4a is a top plan view of the cartridge with its cover 200 partially cut off illustrating the cartridge 100 in operation inside the drive base 990. Inside the cartridge 100, a magnetic disk 170 is mounted onto the disk spindle 118. Both the magnetic disk 170 and the spindle 118 rotate steadily relative to the cartridge 100 as the disk spindle 118 is engaged and powered by the spindle translation interface 325 and the spindle motor 321. A pair of magnetic read/write heads 160 are loaded onto and are flying above the top and bottom surfaces of the disk 170. On the disk surfaces, analog magnetic data can be written in and read out, through a set of conducting wires 164 bounded to a set of suspension beams 162 mounted onto swage-plates 163a of a set of load arms 163 of the voice coil/head stack assembly 150. At the other end of the assembly 150, a voice coil 155 is bonded firmly with its pair of wires 156 connected to a flexible printed circuit board or FPCB 146, on which a pre-amplifier chip 145 is assembled. The conducting wires 164 from the head 160 carry read/write signals to the pre-amplifier 145. A mini flex cable 141 of the cartridge transports both the read/write signals between the pre-amplifier chip 145 and the outlet interconnection pad 180, and the direct currents between the voice coil 155 and the outlet interconnection pad 180 via its wires 156. Another set of wires 136a, bonded onto the bottom case 110, transport direct current from the outlet interconnection pad 180 to a magnetic crash stop 136 which magnetically holds one side of metal arm 154 of the voice coil 155. Another crash stop 137 together with the magnetic crash stop 136 at another end of a voice coil cavity 120 of the bottom case 110 restrains the movement of the voice coil 155 within a defined angle of rotation around the pivot 158 of the voice coil assembly 155. Covering the top side of the outlet interconnect pad 180 is a desiccant-house assembly 185. The desiccant-house assembly 185 hosts a desiccant 186 which absorbs moisture and organic solvent, and thus, controls the interior environment of the cartridge 100 once it is enclosed and in operation for its life time. Near the third location 240 of mechanical engagement with the upper and lower plates 500, 300 is a head load/unload ramp assembly 190 mounted via two screws 191,192 onto the bottom case 110 inside the cartridge 100. The ramp 190 is for unloading and holding the read/write heads 160 during non-operation of the cartridge 100 and loading of the read/write heads 160 for commencement of operation of the cartridge 100. On the far corner of the cartridge 100 opposite the outlet interconnection pad 180, an air flow channel 187 is engraved on the bottom case 110 so that air flow passing the channel 187 is filtered by a re-circulation filter 188.

FIG. 4b is top plan view of the cartridge 100 with its cover 200 removed with the cartridge 100 in operation inside the drive base 990 in accordance with the present invention. On the surfaces of the rotating disk 170, there are two cylindrical regions where magnetic data can be written and retrieved. A narrow region 172 is particularly reserved for storing critical data on the cartridge itself, preferably near the most inner radius that the read/write heads 160 can access on the surfaces of the disk 170. The other much bigger region 173 is available for storing and retrieving user-defined data. The critical data stored in the reserved region 172 are pre-written in when the cartridge 100 is assembled and tested prior to final enclosure and shipment for user application. The critical data can include, but is not limited to, an optimal set of read and/or write currents for each of the two head/disk surface combinations of one cartridge, a list of defects on each of the disk surfaces associated with their heads, and/or mechanical resonance frequencies of the voice coil/head stack/disk spindle assembly. This critical data insures optimal performance of the cartridge 100 and the drive base 990. This critical data can be encoded to prevent access to the information by unauthorized users and/or to prevent use copying. An open circular cavity is engraved in the bottom case 110 of the cartridge to create a shrouding 175 for the disk 170 so that airflow adjacent to the disk 170 is stabilized and drag force/torque of the airflow is reduced.

FIG. 4c is a top plan view of the cartridge with its cover removed wherein the cartridge 100 has been removed from the drive base 990 and the read/write heads 160 are unloaded and locked onto a set of load/unload ramps 190. When the drive 999 is ready to stop operating the hosted cartridge 100, the voice coil 155 is moved to a far side of the voice coil cavity 120 such that the heads 160 are outside of the outer radius of the disk 170. Meanwhile, a set of lifting tips 161 are ramped onto the load/unload ramps 190 so that the heads 160 are lifted off from the surfaces of the disk 170 and moved further away to the position where voice coil/head stack assembly 150 is locked by the crash stop 136. Next, the motor spindle 321 ceases rotation to full stop, stopping rotation of the disk 170, thereby allowing the cartridge 100 can be removed from the drive base 990.

FIG. 4d is a top plan view of a cartridge 100 employing an alternative drive system. In FIG. 4d, the cartridge 100 has been removed from the drive base 990 and the read/write heads 160 are parked on the disk surfaces at an inner radius of the disk 170 using a contact-stop-start mechanism, in accordance with the present invention. Instead of unloading the read/write heads 160 off from the surfaces of the disk 170, the heads 160 are allowed to land on a dedicated region, or landing zone 171, at the most inner radius the heads 160 can reach when the disk 170 spins down to full stop. The crash stop 136 can hold and lock the voice coil/head stack assembly 150 and thus, the keep the heads 160 steady when the cartridge is in a non-operating mode.

FIG. 4e is a top plan view of the cartridge base 110 with the voice coil/head/disk assembly 155 removed. Here, only the load/unload ramp assembly 190 is left inside the cartridge base 110. In an alternative embodiment of this invention, a central piece 115 is molded/bonded to the surrounding piece 116 of the cartridge base 110, which corresponding to the central piece 215 in FIG. 3. The central piece 115 is preferably made of special metal sheet that can shield both electrical discharge/interference and magnetic flux from inferring with the interior cavities of the cartridge 100 where the disk 170 and the heads 160 are housed. The surrounding piece 116 is made of carbon-filled plastic, which can shield electrical discharge. On the opposite side of the cartridge base 110, a mounting hole 180a is made for mounting the outlet interconnection pad 180 (see FIG. 4d) onto the base 110.

FIG. 4f is a bottom plan view of the cartridge base 110 with the cover 200 and voice coil/head/disk assembly 150 removed for clarity. Here, the outlet interconnection pad 180 within the bottom case 110 is shield-covered by a metal shield shutter 280 which can shield the outlet interconnection pad 180 from external electrical-magnetic inference (EMI) and electrostatic discharge (ESD). When the cartridge 100 is translated into the drive base 990, the metal shield shutter 280 is slidably opened by the drive along the shutter's sliding tracks 285, so that the outlet interconnection pad 180 is exposed for contact connection. A rectangular-shaped recess 112 on the end 104 of the cartridge 100 together with end 102 of the cartridge 100 cooperate with the slots 402 and 404 to guide the sliding of the cartridge 100 into the drive base 990 as shown in FIGS. 1, 1a, 1b, and 1c, in only one direction and one configuration as illustrated in FIG. 2. For example, the cartridge, if flipped upside down, cannot slide fully into the drive.

FIG. 4g is an enlarged view of the metal shield shutter 280 on top of the outlet interconnects pad 180, while FIG. 4h is the cross-section of the shutter 280 and the interconnect pad 180. When the cartridge 100 is not engaged with the drive, the shutter 280, is pulled by the shutter pull-back spring 281 in the direction 281a, which maintains the cover in a closed position covering and shielding the outlet interconnect pad 180 and the mounting hole 180a. As the cartridge 100 is properly placed into the drive between the upper and lower plates, a shutter opener 390 of the lower plate 300 is driven into a shutter push-lock window 282 in the direction 391. This action unlocks the shutter 280 from a shutter locker 283, and drags (i.e., slides) the shutter 280 on the sliding tracks 285, thus opening the mounting hole 180a to reveal the outlet interconnect pad 180.

A preferred embodiment for engaging the mother connection pad 380 of the drive's lower plate 300 to the outlet interconnect pad 180 is illustrated in FIG. 4h. As the shutter 280 is unlocked and dragged away from covering and shielding the mounting hole 180a and the outlet interconnect pad 180, the mother connection pad 380 is driven along the trajectory 385 to clip or clamp connect with the outlet interconnect pad 180 of the cartridge from the cartridge's bottom. Here, the lips 181a of the metal pins 181 of the mother connection pad 180 are clamped or clipped onto the tongues 181a of the metal pins 181 of the outlet interconnect pad 180. Thus, the mother connection pad 380 is in firm contact and good electrical connections with the outlet interconnect pad 180 are formed. As they are being disengaged, the mother connection pad 380 is moved in the reverse path of the trajectory 385 till they are properly disengaged. Once the shutter opener 390 is withdrawn in the reverse of the direction 391 and disengaged with the shutter lock window 282, the shutter pull-back spring 281 pulls back the shutter 280 in the direction 281*a* to close the mounting hole 180*a* and to cover and shield the outlet interconnect pad 180. The shutter locker 283 then locks the shutter 280 in place to cover and shield the mounting hole 180*a* and the outlet interconnect pad 180.

Figure 5:
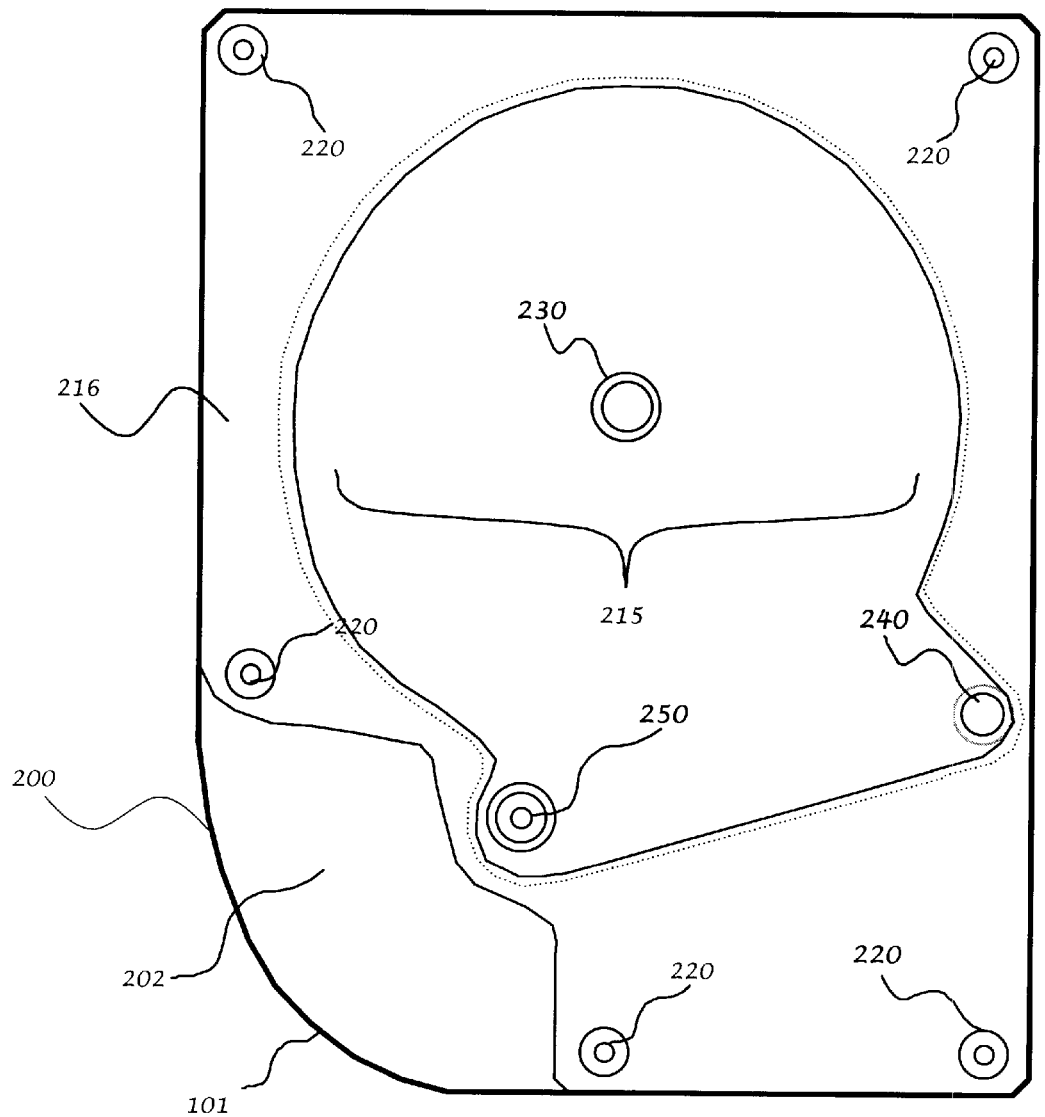
FIG. 5 is a top plan view of the cover of the magnetic storage cartridge in accordance with the present invention.

FIG. 5 is a top view of the cartridge's cover 200 according to this invention. The surrounding piece 116 of the cover 200 has a corresponding recess 202 mirroring the recess 102 on the bottom of the bottom case 110. However, it preferably does not have a rectangular-shaped recess similar to the recess 112 of the base; thus, a flipped cartridge can not slide fully into the drive. The figure also shows the preferable configuration of the three preferred docking locations, the disk spindle/docking hole 230, the docking location/mounting screw at pivot 250, and the third docking location 240.

Figure 6:
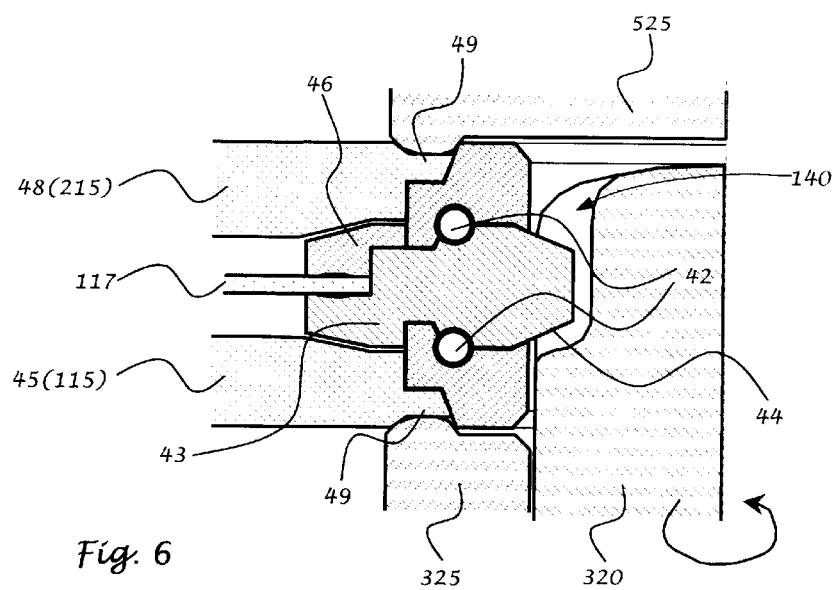
FIG. 6 is a partial cross sectional view of a disk spindle assembly inside the magnetic storage cartridge and a motor spindle engaging system mounted to drive base in accordance with the present invention.

FIG. 6 is a cross-section side view of the disk spindle assembly 118 and spindle translator 320. The disk spindle 43 is locked in position via the engagement feature 525 of the upper plate of the drive base 990 and the motor spindle interface 325 and the spindle 320. The disk 170 is clamped by two spacers 46 and the disk clamp 47 onto the disk spindle 43 which can translate rotation of the motor spindle interface 325 and the spindle 320 to the clamped disk 170 at the same rotation speed. The bearing 42 can separate such rotation from the disk spindle top mount 41, the mounting screw 49, and the mounted cover 48/215 with the disk spindle, as well as the bottom case 45/115; thus, the cartridge remains steady while the disk 170 is rotating inside.

Figure 6A:
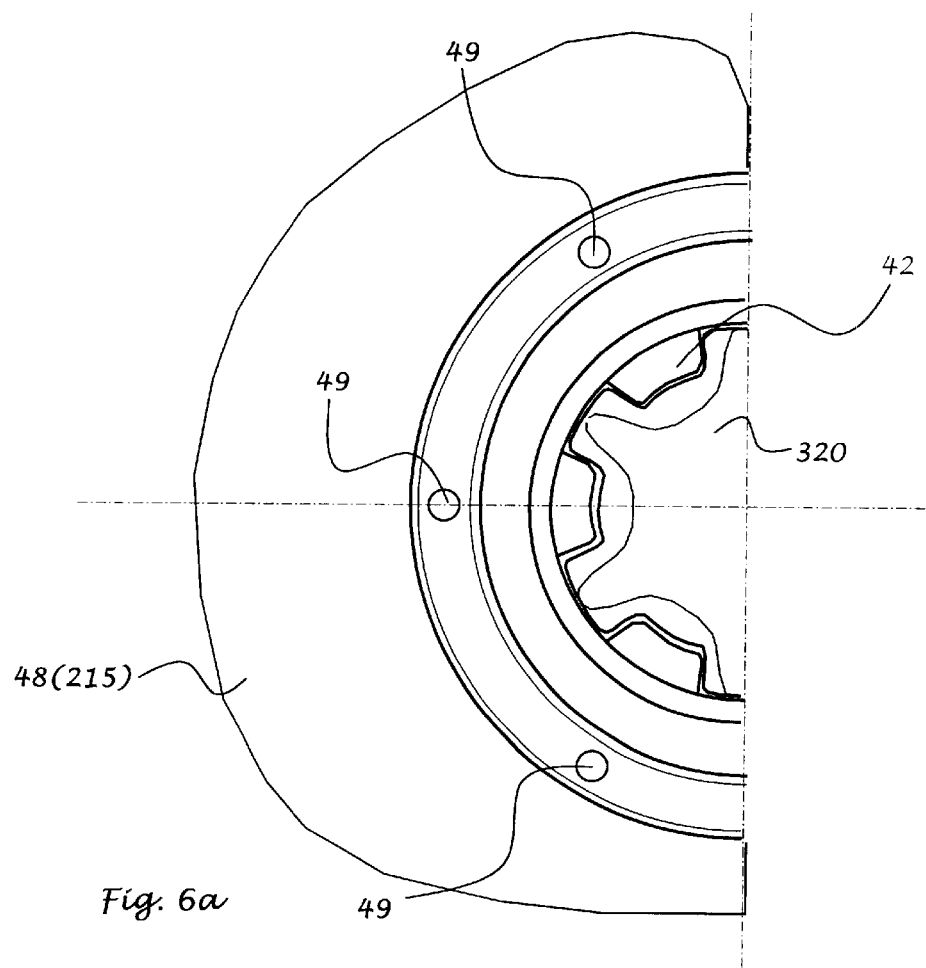
FIG. 6a is a partial plan view of the disk spindle assembly and the motor spindle engaging system shown in FIG. 6.

Another embodiment of this invention is any modification or variation of the above configuration of the motor-to-disk spindle engagement, such as one illustrated in FIG. 6*a*. Such modification is made so the motor spindle interface 325 engages the disk spindle 43 inside the inner cylinder of the disk spindle 43. Thus, the rest of the spindle translation interface, non-rotating part, 325, can be firmly pressed onto the central metal piece 45(115) of the cartridge's bottom case, thereby clamping the cartridge at the disk spindle 43 location with the engagement feature 525 (at the spindle) of the upper plate. This will help translate rotational motion smoothly from the drive's motor to the disk spindle 43, and mechanically constrain undesired relative vertical and horizontal motions between the cartridge 100 and the drive base 990.

Figure 6B:
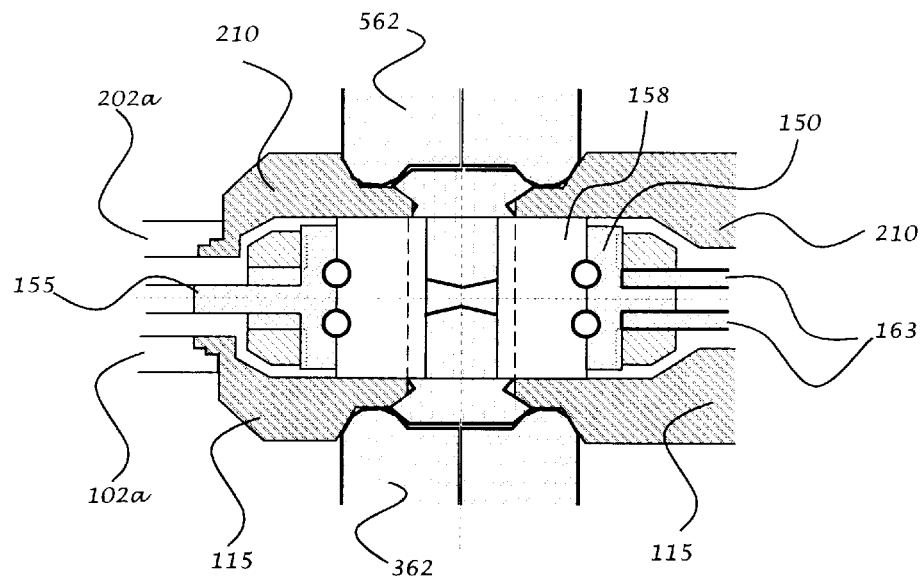
FIG. 6b is a partial cross sectional view similar to FIG. 6 illustrating engagement features of the loading mechanism engaged with the magnetic storage cartridge at the rotational axis of the magnetic disk.

FIG. 6*b* is a sectional view illustrating the second engagement features 562 and 362 of the upper and lower plates 500, 300 engaging the cartridge 100 at the pivot 158 of the voice coil/head stack assembly 150 as previously described.

Figure 6C:
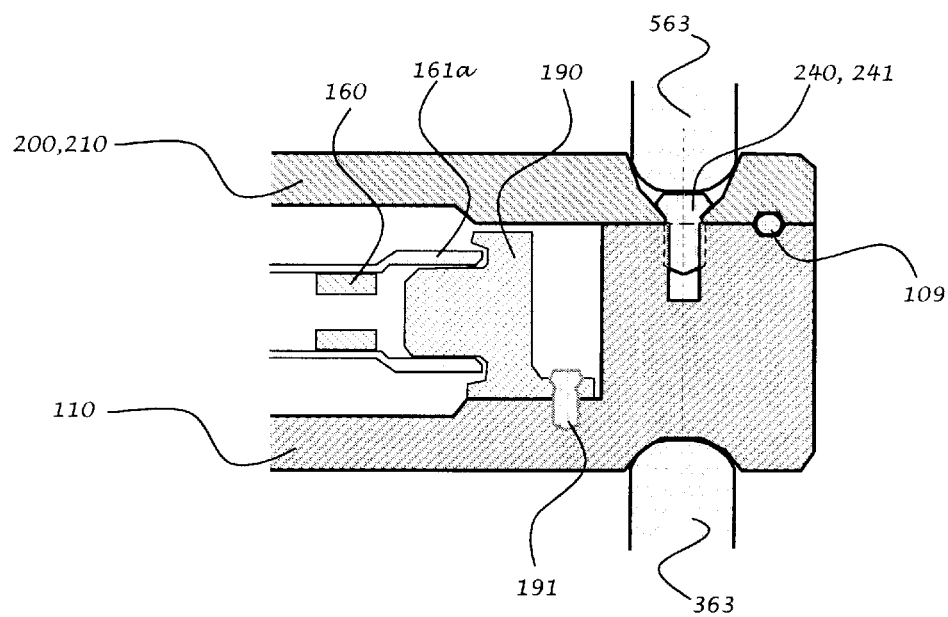
FIG. 6c is a partial cross sectional view illustrating engagement features of the loading mechanism engaged with the magnetic storage cartridge at the pivot axis of the actuator arrangement.

FIG. 6*c* is a sectional view illustrating the third engagement features 563 and 363 of the upper and lower plates 500, 300 engaging the cartridge 100 at the corresponding engagement features 240, 140 as previously described. A compression seal ring 109 position between the base 110 and the cover 200 of the cartridge 100 seals the interior of the cartridge 100 from contaminants.

Figure 7:
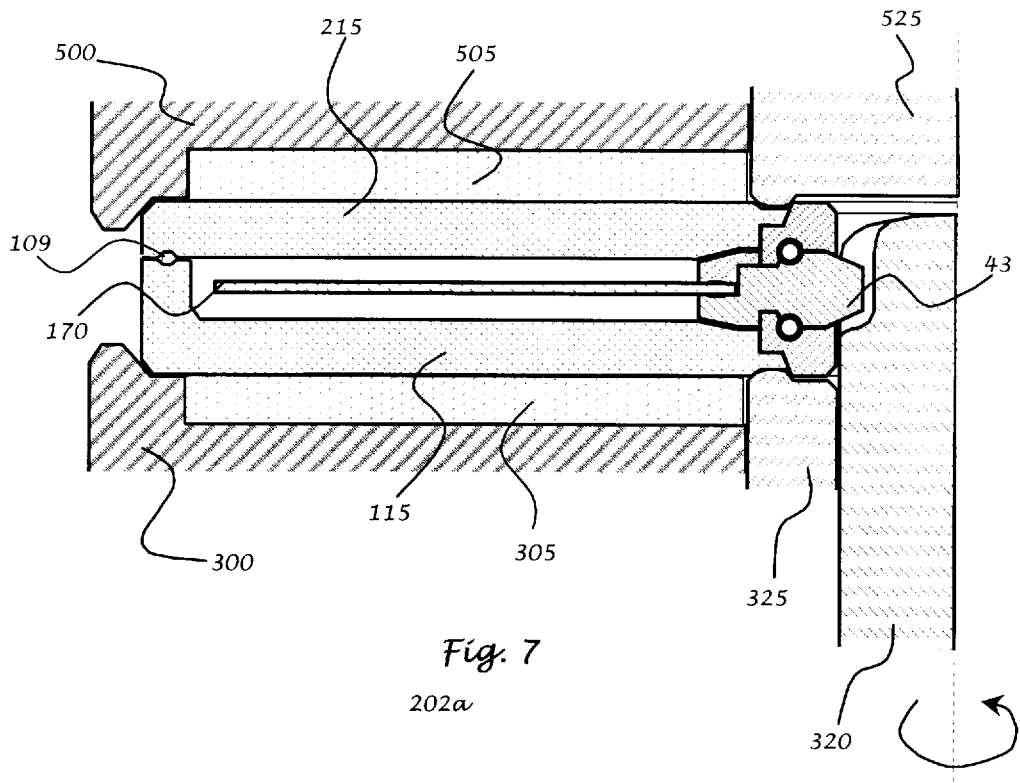
FIG. 7 is a partial cross sectional view of the magnetic storage cartridge and upper and lower plates of the loading mechanism shown through the axis of disk spindle, the spindle-translation interface, and the motor spindle.

FIG. 7 is a cross-section view of the cartridge 100, the upper and lower plates 500, 300 of the drive base 990 in operation mode through the vertically merged axis of disk spindle 118, the spindle-translation interface 325, and the motor spindle 320 according to this invention. The cross-section is taken in reference to FIGS. 2 and 4*a*. As the upper plate 500 and the lower plate 300 engage with the cartridge 100, the engaging feature 525 locks the cartridge at the spindle with the motor spindle interface 325 which also engages the disk spindle 43 upwards. Layers 505 and 305 are attached to the upper and lower plates 500 and 300. These layers 505, 305, are preferably made of vibration/noise absorbing/damping and/or heat absorbing materials, and firmly contact the cover 200/215 and the bottom case 110/115 of the cartridge. Thus, the level of vibration and noise generated inside the cartridge is reduced.

Figure 7A:
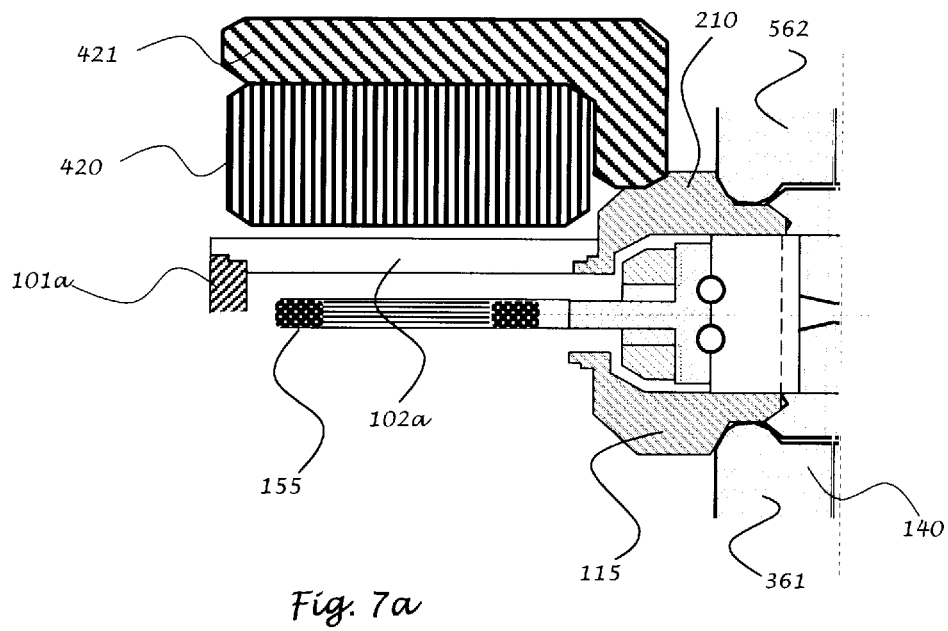
FIG. 7a is a partial cross sectional view of magnetic engagement of a rounded corner of the magnetic storage cartridge with the external polarized magnets of the drive base, showing the relative configuration of the voice coil, the metal corner frame and the pivot assembly of the actuator arrangement.

FIG. 7*a* is a cross-section view of magnetic engagement of the round corner 101 of the cartridge 100, as shown in FIG. 2, with the external magnets 420 mounted to rack assembly 400 of the drive base 990. This illustrates the relative configuration of the voice coil 155, the metal corner frame 101*a* and the pivot assembly and docking as shown in FIG. 6*b*, with the magnets 420 and a mounting frame 421 of the rack assembly 400. The magnets 420 are in proximity engagement with the round corner 101 and emit magnetic flux which passes through the permeable, but non-ferromagnetic piece 202*a* with minimum loss of magnetic flux. This magnetic flux interacts with the voice coil 155 to induce an electric current. The magnets 420 are firmly mounted onto their respective mounting frame 421, which also provides prevents residual magnetic flux from the magnet 420 from flowing in other directions than through the voice coil 155. A non-ferromagnetic metal corner frame 101*a* is shown molded with the high permeable piece 102*a*, stiffening the round corner 101 mechanically.

Figure 8:
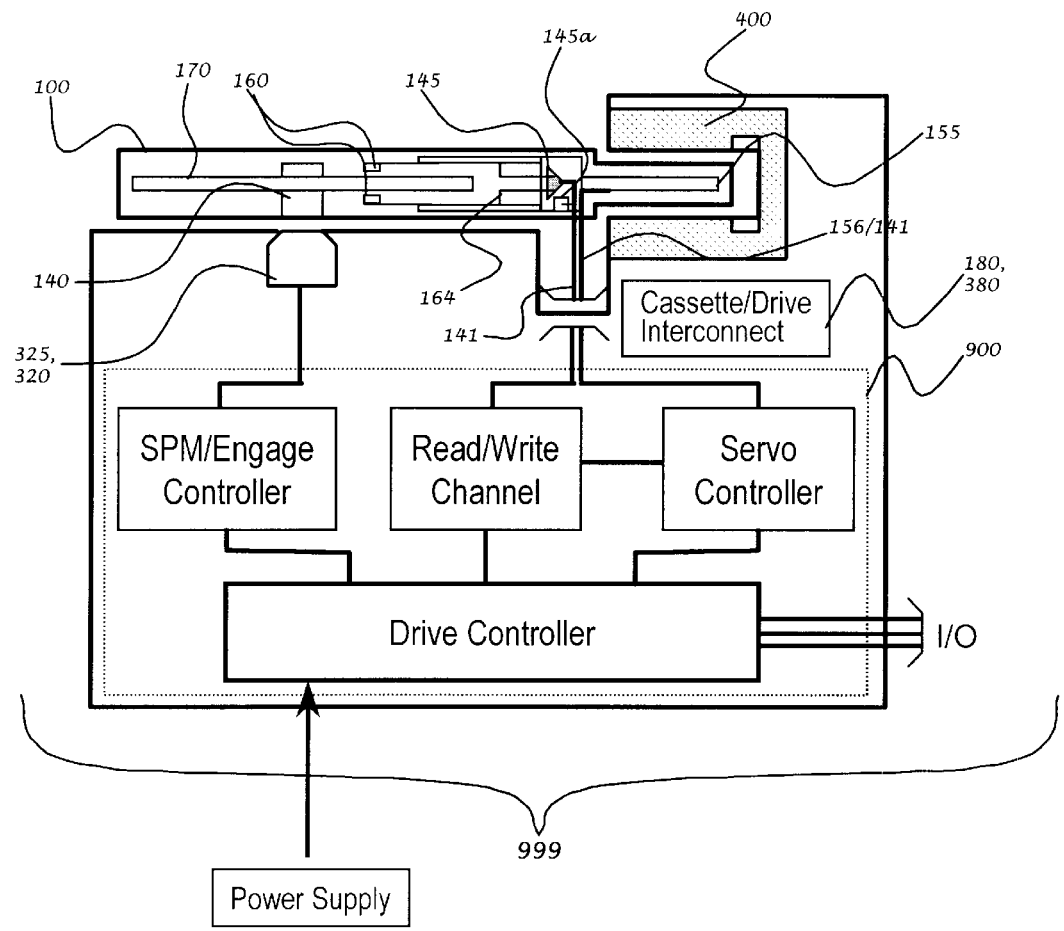
FIG. 8 is a schematic representation of the electrical circuits inside the disk drive system.

FIG. 8 is the schematic of the core embodiment in the electrical integration of the whole drive system 999 with the removable (memory) cartridge 100. The PCBA 900 electrically engages the cartridge 100 via the cartridge's outlet interconnect pad 180 and the mother board connection pad 380 of the PCBA 900. Thus, the voice coil 155 is connected with the servo controller of the drive 999 via the voice coil wires 156 and the mini flex cable 141. In addition, the magnetic heads 160 and the preamplifier chip 145 and the ROM chip 145*a* are connected to the read/write channel of the drive 900, via the conducting wires (cables) 164 and the mini flex cable 141. Under the electro-mechanical control of the drive's SPM/Engage controller, the disk 170 and its spindle 140 are mechanically engaged with drive's spindle motor 325/320. The drive's SPM/Engage controller also controls and coordinates all the other mechanical engagements of the drive 999 and its subsystems with the cartridge 100. These include, locking the cartridge 100 firmly between the plates 500, 300 inside the drive base 990, opening the metal shield shutter 280 (not shown in FIG. 8) and engaging the cartridge's outlet interconnect pad 180 and the mother board connection pad 380.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. For example, the dimensions of the circular disk, i.e. the inner and outer diameters as well as the thickness, are not limited to any particular standard dimensions, such as 3-½ inch diameter and 31 mil thick. Thus, the dimensions of all the other components of the drive and the cartridge are not limited to particular standards. The substrate of the disk is not limited to any particular type, such as Aluminum, glass or plastic. A head load/unload mechanism can also be employed at the inner diameter side of the disk inside the cartridge. Lastly but not least, a single magnet, rather than a pair of two facing magnets, can be employed and mounted onto one of the rack members of the drive base. This application is intended to cover any adaptations or variations of the preferred embodi-

What is claimed is:

1. A disk drive for selectively receiving a disk cartridge including a magnetic disk rotatable about a first axis and a voice coil/head stack assembly rotatable about a second axis, including:
   a spindle translator for rotatably receiving and providing rotation to the magnetic disk, the spindle translator being coincident with the first axis;
   a first engagement feature separate from the spindle translator for locking the disk cartridge with respect to the disk drive and being coincident with the first axis;
   a second engagement feature for locking the disk cartridge with respect to the disk drive and being coincident with the second axis;
   a mechanism for providing a magnetic field to the voice coil/head stack assembly to rotate the voice coil/head stack assembly about the second axis;
   wherein the first and second engagement features are configured to decrease vibration of the disk cartridge with respect to the disk drive due to spinning of the magnetic disk and electromagnetic actuation of the voice coil/head stack assembly.

2. The disk drive of claim 1, wherein the first and second engagement features mechanically constrain undesired relative vertical and horizontal motions between the disk cartridge and the disk drive to decrease vibration.

3. The disk drive of claim 1, wherein the spindle translator and the first engagement feature are concentrically positioned.

4. The disk drive of claim 1, further including a third engagement feature for locking the disk cartridge with respect to the disk drive, the third engagement feature being spaced from the first and second engagement features.

5. The disk drive of claim 4, wherein the first, second, and third engagement features are in a triangular arrangement.

6. The disk drive of claim 1, wherein the first engagement feature includes a pin.

7. The disk drive of claim 1, wherein the first engagement feature includes a first portion being concentrically positioned with the spindle translator and a second portion, the first portion and second portion being configured to interact with opposite sides of the disk cartridge.

8. The disk drive of claim 1, wherein the disk drive further includes a mounting plate, and the second engagement feature is attached to and stationary with respect to the mounting plate.

9. The disk drive of claim 1, wherein the mechanism for providing a magnetic field includes a magnet emitting a magnetic flux that interacts with the voice coil/head stack assembly to induce an electric current and actuate the voice coil/head stack assembly.

10. The disk drive of claim 1, further including a motor configured to create rotational motion, wherein the spindle translator is configured to translate the rotational motion from the motor to the magnetic disk causing the magnetic disk to rotate about the first axis.

11. A disk drive system comprising:
    a disk cartridge including:
      a magnetic disk rotatable about a first axis, and
      a voice coil/head stack assembly rotatable about a second axis;
    a disk drive including:
      a spindle translator for rotatably receiving and driving the magnetic disk, the spindle translator being coincident with the first axis,
      a first engagement feature for locking the disk cartridge with respect to the disk drive and being coincident with the first axis,
      a second engagement feature for locking the disk cartridge with respect to the disk drive and being coincident with the second axis, and
      a mechanism for providing a magnetic field to the voice coil/head stack assembly to rotate the voice coil/head stack assembly about the second axis, wherein the mechanism is independent of the second engagement feature.

12. The disk drive system of claim 11, wherein the first and second engagement features mechanically constrain undesired relative vertical and horizontal motions between the disk cartridge and the disk drive.

13. The disk drive of claim 11, wherein the disk drive further includes a third engagement feature for locking the disk cartridge with respect to the disk drive, the third engagement feature being spaced from the first and second engagement features.

14. The disk drive of claim 13, wherein the first, second, and third engagement features are in a triangular arrangement.

15. The disk drive system of claim 11, wherein the disk drive further includes a mounting plate, and the second engagement feature is attached to and stationary with respect to the mounting plate.

16. The disk drive system of claim 11, wherein the disk drive further includes a means for actuating the voice coil/head stack assembly about the second axis including a magnet mounted within the disk drive.

17. The disk drive of claim 11, wherein the disk cartridge further includes an electrical interconnect and the disk drive further includes a circuit board, wherein the electrical interconnect and the circuit board selectively interact to electrically connect the disk cartridge and the disk drive.

18. The disk drive of claim 11, wherein the disk cartridge further includes a shutter that is selectively movable between an open state and a closed state, and when in the closed state, the shutter protects the electrical interconnect from damage caused by factors external to the disk cartridge.

19. A disk drive system comprising:
    a disk cartridge including:
      a magnetic disk rotatable about a first axis, and
      a voice coil/head stack assembly rotatable about a second axis;
    a disk drive including:
      a spindle translator for rotatably receiving and driving the magnetic disk, the spindle translator being coincident with the first axis,
      a first engagement feature for locking the disk cartridge with respect to the disk drive and being coincident with the first axis, at least a portion of the first engagement feature being concentrically positioned with respect to the spindle translator;
      a second engagement feature for locking the disk cartridge with respect to the disk drive and being coincident with the second axis,
      a third engagement feature for locking the disk cartridge with respect to the disk drive, wherein the first, second, and third engagement features are arranged in a triangle,
      a mechanism for providing a magnetic field to the voice coil/head stack assembly to actuate the voice coil/head stack assembly, wherein the mechanism is independent of the second engagement feature.

20. The disk drive system of claim 19, wherein each of the first, second, and third engagement features includes a first portion and a second portion opposite the first portion with respect to the disk cartridge.

* * * * *